US012568282B2

(12) United States Patent      (10) Patent No.:    US 12,568,282 B2

Yu                         (45) Date of Patent:       Mar. 3, 2026

(54) CONTENT DISPLAY METHOD, APPARATUS, DEVICE AND MEDIUM

(71) Applicant: Beijing Zitiao Network Technology Co., Ltd., Beijing (CN)

(72) Inventor: Qin Yu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 119 days.

(21) Appl. No.: 18/572,047

(22) PCT Filed: Oct. 28, 2022

(86) PCT No.: PCT/CN2022/128204

§ 371 (c)(1),
(2) Date: Dec. 19, 2023

(87) PCT Pub. No.: WO2023/072238

PCT Pub. Date: May 4, 2023

(65)         Prior Publication Data

US 2024/0314400 A1     Sep. 19, 2024

(30)       Foreign Application Priority Data

Nov. 1, 2021    (CN) ......................... 202111284585.0

(51) Int. Cl.
     *H04N 21/482*       (2011.01)
     *H04N 21/431*       (2011.01)
             (Continued)
(52) U.S. Cl.
     CPC ..... *H04N 21/4826* (2013.01); *H04N 21/4316* (2013.01); *H04N 21/4334* (2013.01); *H04N 21/47205* (2013.01)

(58) Field of Classification Search
     CPC ........... H04N 21/4826; H04N 21/4316; H04N 21/4334; H04N 21/47205; G06F 3/0482;
                     (Continued)

(56)         References Cited

U.S. PATENT DOCUMENTS

2015/0020216 A1*   1/2015   Mallardo ................ G06F 21/10
                                              726/28
2015/0147048 A1    5/2015   Kim et al.
                     (Continued)

FOREIGN PATENT DOCUMENTS

CN       107645655 A     1/2018
CN       109151552 A     1/2019
                 (Continued)

OTHER PUBLICATIONS

First Office Action issued Aug. 4, 2023 in CN Appl. No. 202111284585. 0, English translation (14 pages).

*Primary Examiner* — Cynthia M Fogg

(57)           ABSTRACT

The present disclosure relates to content display method, apparatus, device, and medium. The content display method comprises: displaying a first control in a target interactive interface; in response to a first trigger operation on the first control, determining a candidate content list, each candidate content in the candidate content list satisfying a preset screening condition; determining a first content list and a second content list based on the candidate content list according to content features of respective candidate contents and/or interactive contents corresponding to the respective candidate contents, wherein each first content in the first content list corresponds to a first type, and each second content in the second content list corresponds to a second type; and displaying the first content list and/or the second content list.

20 Claims, 17 Drawing Sheets

(51) Int. Cl.
  *H04N 21/433*      (2011.01)
  *H04N 21/472*      (2011.01)
(58) Field of Classification Search
  CPC .. G06F 3/04847; G06F 3/0488; G06F 3/1407;
                          G06F 9/451
  USPC .......................................................... 725/61
  See application file for complete search history.

(56)                References Cited

U.S. PATENT DOCUMENTS

| | | | |
|---|---|---|---|
| 2016/0012853 A1 | 1/2016 | Cabanilla et al. | |
| 2016/0295264 A1* | 10/2016 | Yanovsky | H04N 21/482 |
| 2018/0330756 A1* | 11/2018 | MacDonald | G06F 16/951 |
| 2019/0018572 A1* | 1/2019 | Jaini | H04N 21/47202 |
| 2020/0372896 A1 | 11/2020 | Cui et al. | |
| 2020/0379721 A1 | 12/2020 | Liao | |
| 2021/0168473 A1 | 6/2021 | Li | |
| 2022/0108726 A1* | 4/2022 | Li | G11B 27/031 |

FOREIGN PATENT DOCUMENTS

| | | |
|---|---|---|
| CN | 111163274 A | 5/2020 |
| CN | 111580921 A | 8/2020 |
| CN | 111726536 A | 9/2020 |
| CN | 111866434 A | 10/2020 |
| CN | 112004034 A | 11/2020 |
| CN | 112291590 A | 1/2021 |
| CN | 112764636 A | 5/2021 |
| CN | 112987999 A | 6/2021 |
| CN | 113946254 A | 1/2022 |

* cited by examiner

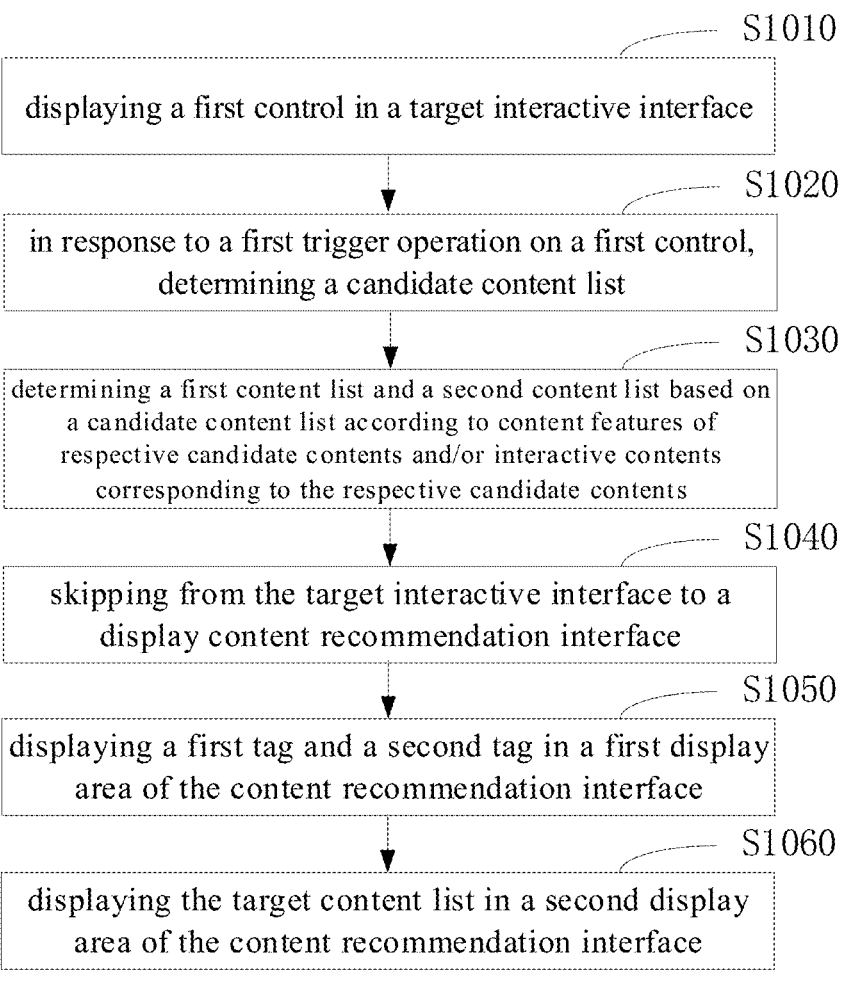

S1010 displaying a first control in a target interactive interface

S1020 in response to a first trigger operation on a first control, determining a candidate content list

S1030 determining a first content list and a second content list based on a candidate content list according to content features of respective candidate contents and/or interactive contents corresponding to the respective candidate contents

S1040 skipping from the target interactive interface to a display content recommendation interface

S1050 displaying a first tag and a second tag in a first display area of the content recommendation interface

S1060 displaying the target content list in a second display area of the content recommendation interface

Fig. 10

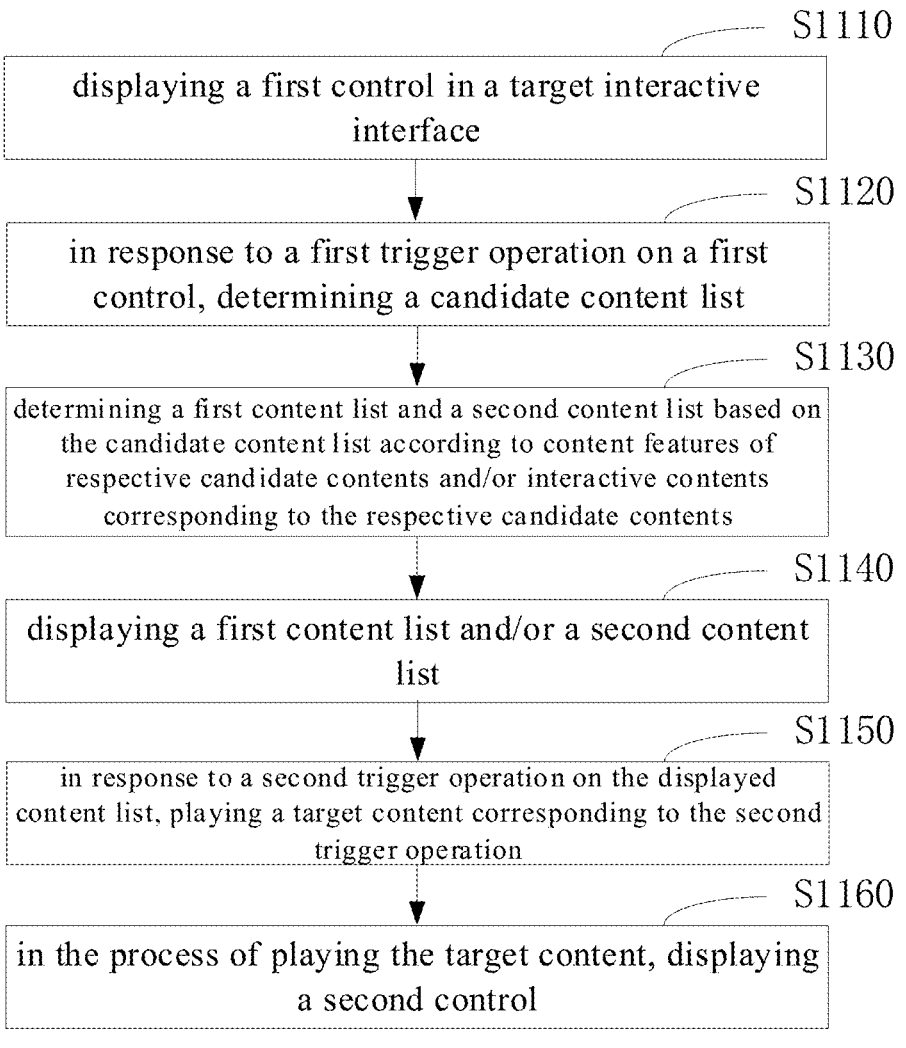

S1110 displaying a first control in a target interactive interface

S1120 in response to a first trigger operation on a first control, determining a candidate content list

S1130 determining a first content list and a second content list based on the candidate content list according to content features of respective candidate contents and/or interactive contents corresponding to the respective candidate contents

S1140 displaying a first content list and/or a second content list

S1150 in response to a second trigger operation on the displayed content list, playing a target content corresponding to the second trigger operation

S1160 in the process of playing the target content, displaying a second control

CONTENT DISPLAY METHOD, APPARATUS, DEVICE AND MEDIUM

CROSS REFERENCE TO RELATED APPLICATIONS

The present application is based on and claims priority from the Chinese application having the application number 202111284585.0, filed on Nov. 1, 2021, the disclosure of which is incorporated herein in its entirety.

TECHNICAL FIELD

The present disclosure relates to the field of electronic devices, and in particular, to content display method, apparatus, device and medium.

BACKGROUND

In daily life, users often use electronic devices to browse media content for recreation and entertainment.

SUMMARY OF THE INVENTION

In a first aspect, the present disclosure provides a content display method, comprising: displaying a first control in a target interactive interface; in response to a first trigger operation on the first control, determining a candidate content list, each candidate content in the candidate content list satisfying a preset screening condition; determining a first content list and a second content list based on the candidate content list according to content features of respective candidate contents and/or interactive contents corresponding to the respective candidate contents, wherein each first content in the first content list corresponds to a first type, and each second content in the second content list corresponds to a second type; and displaying the first content list and/or the second content list.

In some embodiments, each candidate content satisfying a preset screening condition comprises: the number of interactive contents corresponding to the respective candidate contents is larger than or equal to a first threshold value, and/or, the number of the interactions corresponding to the respective candidate contents is larger than or equal to a second threshold value.

In some embodiments, the each candidate content satisfying the preset screening condition comprises: the number of the interactive contents corresponding to each first content is larger than or equal to a third threshold value, and/or, the number of the interactions corresponding to each first content is larger than or equal to a fourth threshold value; and/or, the each candidate content satisfying the preset screening condition comprises: the number of the interactive contents corresponding to each second content is larger than or equal to a fifth threshold value, and/or, the number of the interactions corresponding to each second content is larger than or equal to a sixth threshold value.

In some embodiments, the content features include at least one of a type feature, an interaction feature, a popularity feature, and a release time feature.

In some embodiments, the content features include a type feature determined from video-related text of the candidate content.

In some embodiments, the candidate contents are original contents, the interactive contents are fused contents corresponding to the original contents, the first content is original content and/or fused content corresponding to the original content, and the second content is original content and/or fused content corresponding to the original content.

In some embodiments, said displaying said first content list and/or second content list comprises: skipping from the target interactive interface to a display content recommendation interface; displaying a first tag and a second tag in a first display area of the content recommendation interface, wherein the first tag corresponds to the first content list, and the second tag corresponds to the second content list; and displaying a target content list in a second display area of the content recommendation interface, wherein the target content list is a content list corresponding to a target tag in the first content list and the second content list, and the target tag is a tag in a selected state in the first tag and the second tag.

In some embodiments, the candidate content, the first content and the second content each are video contents; the method further comprising: subsequent to displaying the first content list and/or the second content list, in response to a second trigger operation on displayed content list, playing target content corresponding to the second trigger operation; and displaying a second control in the process of playing of the target content, wherein the second control is used for triggering recording of target video content, and the target video content is fused with target candidate content corresponding to the target content.

In some embodiments, in the process of playing of the target content, the method further comprises: displaying a third control; in response to a third trigger operation on the third control, skipping from the target interactive interface to a display video presentation interface; and displaying the second control and an interactive content list corresponding to the target content in the video presentation interface, wherein the respective interactive contents in the interactive content list are all fused with the target candidate content.

In some embodiments, the target video content further includes a target element that is associated with a content feature corresponding to the first type or the second type.

In some embodiments, the method further comprises: in response to a fourth trigger operation on the second control, displaying a first video recording interface, wherein the first video recording interface comprises a first interface area and a second interface area, the first interface area is used for recording video content, and the second interface area is used for displaying the target candidate content; acquiring a target element; in the process of recording the video content, shielding a target object in the first interface area by using the target element; and when the video content recording is finished, generating the target video content by using the video content and the target candidate content.

In some embodiments, the target interactive interface comprises at least one of: a second video recording interface, wherein the first control is a recording option in the second video recording interface; a video playing interface, wherein the first control is a fixed function button or a dropdown menu option in the video playing interface; or a social interactive interface, wherein the first control is a recommendation option in the social interactive interface.

In a second aspect, the present disclosure provides a content display apparatus, comprising: a first display unit configured to display a first control in the target interactive interface; a first processing unit configured to determine a candidate content list in response to a first trigger operation on the first control, wherein each candidate content in the candidate content list satisfies a preset screening condition; a second processing unit configured to determine a first content list and a second content list based on the candidate content list according to content features of the respective candidate contents and/or interactive contents corresponding to the respective candidate contents, wherein each first content in the first content list corresponds to a first type, and each second content in the second content list corresponds to a second type; and a second display unit configured to display the first content list and/or the second content list.

In a third aspect, the present disclosure provides an electronic device, comprising: a processor; and a memory for storing executable instructions; wherein the processor is configured to read the executable instructions from the memory and execute the executable instructions to implement the content display method of the first aspect.

In a fourth aspect, the present disclosure provides a computer-readable storage medium storing a computer program which, when executed by a processor, causes the processor to implement the content display method of the first aspect.

In a fifth aspect, the present disclosure provides a computer program comprising: instructions which, when executed by a processor, cause the processor to implement the content display method of the first aspect.

In a sixth aspect, the present disclosure provides a computer program product comprising instructions which, when executed by a processor, implement the content display method of the first aspect.

DESCRIPTION OF THE DRAWINGS

With reference to the drawings and the following embodiments, the above and other features, advantages, and aspects of embodiments of the present disclosure will become more apparent. Throughout the drawings, the same or similar reference signs refer to the same or similar elements. It should be understood that the drawings are schematic and that elements and components are not necessarily drawn to scale.

FIG. 10 is a schematic flow chart illustrating another content display method provided by an embodiment of the disclosure;

FIG. 11 is a schematic flow chart illustrating another content display method provided by the embodiment of the disclosure;

DETAILED DESCRIPTION

Figure 1:
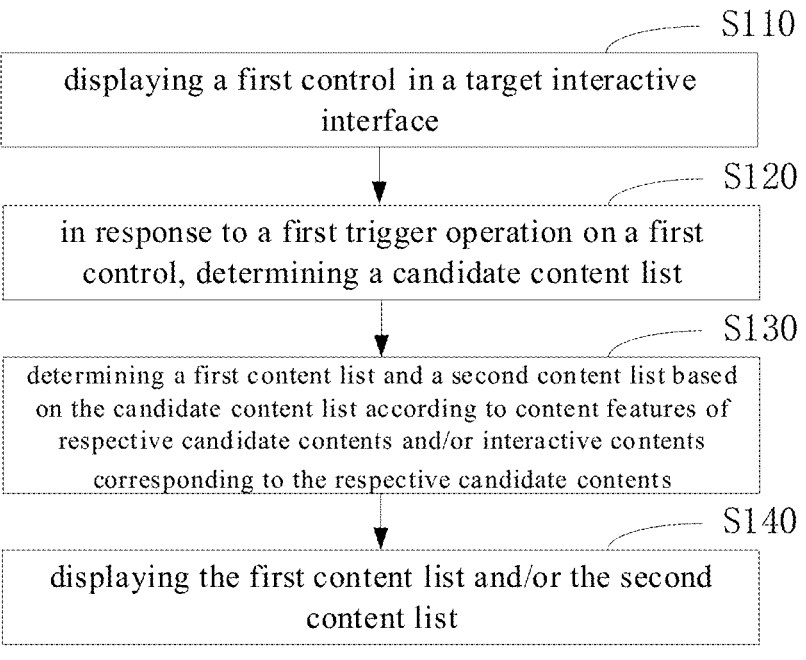
FIG. 1 is a schematic flow chart illustrating a content display method provided by an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein, but rather, they are provided for a more complete and thorough understanding on the present disclosure. It should be understood that the drawings and the embodiments of the disclosure are for illustration purposes only and are not intended to limit the scope of the disclosure.

It should be understood that the respective steps recited in method embodiments of the present disclosure may be performed in a different order, and/or performed in parallel. Moreover, method embodiments may include additional steps and/or omit the illustrated steps. The scope of the present disclosure is not limited in this respect.

The term "comprising" and the variations thereof as used herein is intended to be open-ended, i.e., "comprising but not limited to". The term "based on" means "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the concepts "first", "second", and the like in the present disclosure are only used for distinguishing different devices, modules or units, and are not used for limiting the order or interdependence of the functions performed by the devices, modules or units.

It should be noted that references to "one" or "multiple" in this disclosure are intended to be illustrative rather than limiting, and that those skilled in the art will appreciate that references to "one or more" are intended to be exemplary and not limiting unless the context clearly indicates otherwise.

The names of messages or information exchanged between devices in the embodiments of the present disclosure are for illustrative purposes only, and are not intended to limit the scope of the message or information.

The inventors of the present disclosure find that, in the related art, there may be a problem of how to enable a user to quickly implement content screening and promote the user's will of creating related content during the process of browsing media content by the user.

In view of this, the embodiments of the present disclosure provide content display method, apparatus, device, and medium that can improve user browsing experience.

The content display method provided by the embodiment of the present disclosure is first described below with reference to FIGS. 1 to 16.

FIG. 1 illustrates a flow chart of a content display method provided in an embodiment of the present disclosure.

In the embodiment of the disclosure, the content display method may be performed by an electronic device. The electronic device may include, but is not limited to, a mobile terminal such as a mobile phone, a laptop computer, a digital broadcast receiver, a PDA (personal digital assistant), a PAD (tablet), a PMP (portable media player), a vehicle-mounted terminal (e.g., a vehicle-mounted navigation terminal), a wearable device, and the like, or a stationary terminal such as a digital TV, a desktop computer, a smart home device, and the like.

As shown in FIG. 1, the content display method may comprise the following steps S110 to S140.

In step S110, a first control is displayed in a target interactive interface.

In an embodiment of the disclosure, when a user wants to interact with a target application platform, the user may perform an operation related to opening of a target application corresponding to the target application platform or perform a corresponding trigger operation in the target application program followed by displaying a target interactive interface.

In some embodiments, the target interactive interface may be any display interface on a content release platform/social platform that is capable of interacting with a user of an electronic device. For example, it may be a content playing interface, a content recording interface, or a social interactive interface, which is not specifically limited.

In some embodiments, the first control may be an operational control provided to a user to facilitate the user to trigger display of a first content list and/or a second content list. Illustratively, the first control may be a virtual operation control having a function of skipping to display the first content list and/or the second content list. In one example, the first control may be fixedly displayed on a target interactive interface, such as a fixed function button, a fixed option control, or the like. Alternatively, the first control may be a control that is displayed on a target interactive interface after the user performs a corresponding trigger operation on the target interactive interface. For example, the first control may be a menu option displayed in a menu corresponding to a menu control after the user triggers the menu control on a target interactive interface. Alternatively, the first control may be an option control that is displayed in a sliding manner after the user performs a sliding operation in a target display area on the target interactive interface. For example, the target display area may be a display area in the form of a card, and accordingly, the respective option controls may be cards.

In some embodiments, the target interactive interface may be an interface capable of setting a first control. In some embodiments, the target interactive interface may include at least one of: a second video recording interface, a video playing interface and a social interactive interface.

The second video recording interface may be an interface with a video recording function within the target application.

In some embodiments, a skip to the second video recording interface may be triggered by a capture control or other interactive controls.

The video playing interface may be an interface with a video playing function in a target application. In some embodiments, it may be a video recommendation area on the main interface after the target application is opened, a playing area of video released by friends of the user (for example, users of mutual concern with the user of the electronic device), a playing area of video released by a user in the same city, or a video playing interface for playing video in a video stream by, for example, page skip, or it may also be a video playing interface for playing video in a non-video stream, which is not limited here.

The social interactive interface may be an interface within a target application with a function to interact with other users. In some embodiments, the social interactive interface may display controls for interacting with other users, such as a function control to chat with other users, or to skip to other users' social home pages, or to co-play games with other users, which is not limited here.

The target interactive interface and the first control will be described in detail below by way of a number of examples.

In one embodiment, where the target interactive interface comprises a second video recording interface, accordingly, the first control is a recording option in the second video recording interface.

In some embodiments, the first control in the form of a recording option may be a function option that enables selection of a particular recording mode of the video. That is, the candidate contents in the candidate content list are contents for providing a type of recording manner. For example, in a video application, the candidate content list is a video for providing the user with a co-shooting or co-singing operation, i.e., the user can record the co-shooting or co-singing with the video of the candidate content. Illustratively, the first control is a recording option that requires video recording based on related contents in the first content list and/or the second content list. Accordingly, the first content list and/or the second content list can be displayed by a skip through the recording option, and then relevant video recording is carried out based on touch operations in the first content list and/or the second content list. For example, a co-shot video or a co-sung video is recorded based on touch operations in the first content list and/or the second content list.

In some embodiments, a first control in the form of a recording option may be disposed in an edge area of the second video recording interface. For example, it may be disposed in a function bar or toolbar on any of the upper, lower, left, and right sides of the second video recording interface, and the specific arrangement manner is not limited. In addition, the recording option may be disposed above the preview interface of the captured video, or disposed outside the preview interface of the captured video, which is not limited here.

Figure 2:
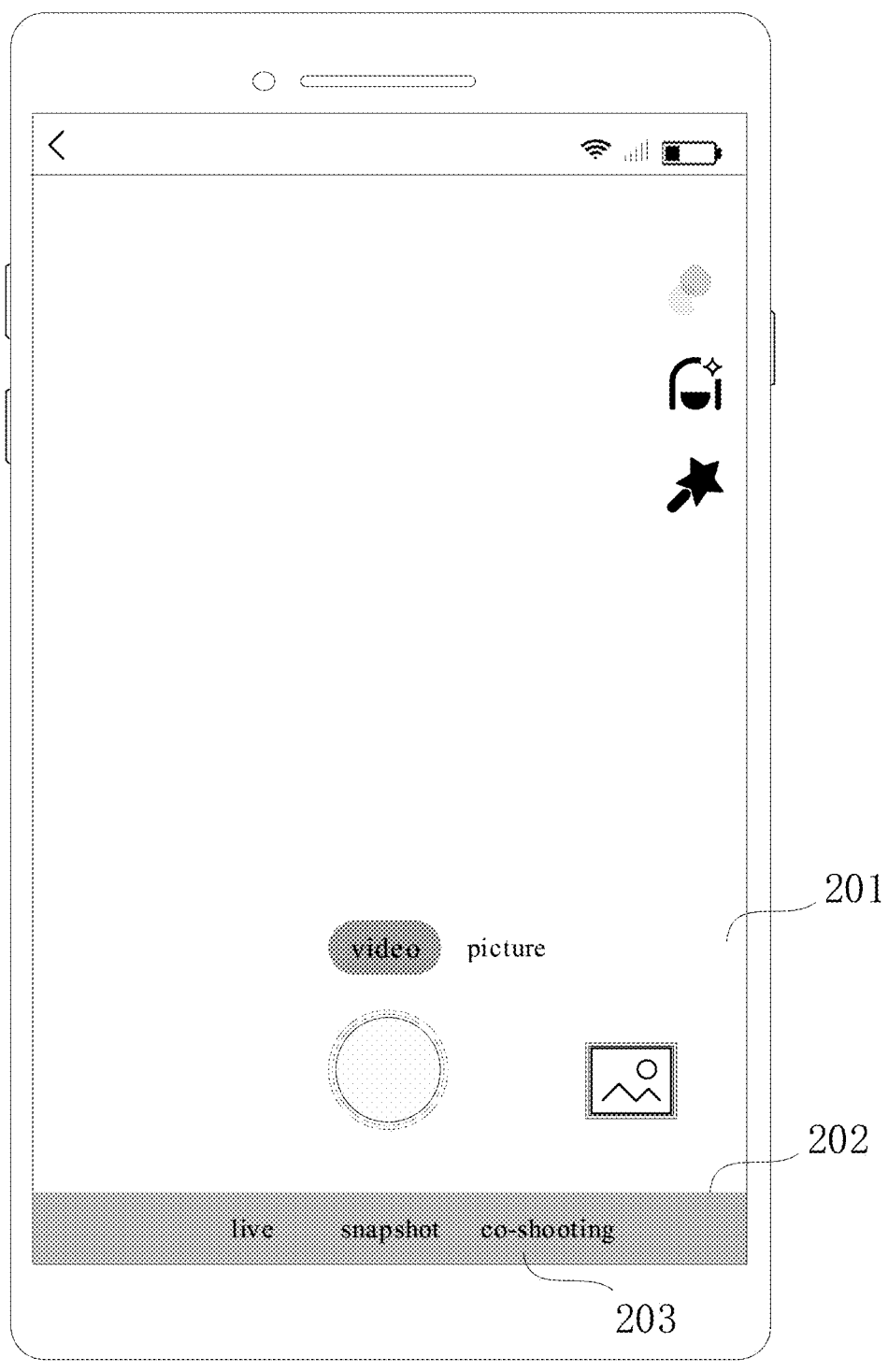
FIG. 2 is a schematic diagram illustrating a second video recording interface provided by an embodiment of the present disclosure.

Illustratively, FIG. 2 shows a schematic diagram of a second video recording interface provided by an embodiment of the present disclosure. As shown in FIG. 2, a recording option 203 with a "co-shooting" function may be displayed in a function bar 202 on the lower side of the second video recording interface 201. When the user clicks the record option 203 with the "co-shooting" function, the first content list and/or the second content list may be displayed on the user's electronic device.

In another example, where the target interactive interface comprises a video playing interface, the first control is a fixed function button or a dropdown menu option in the video playing interface. It should be noted that the first control may also be a dropdown menu option in another target interactive interface, for example, a dropdown menu option in a social interactive interface, a video shooting interface, or a video display interface, which is not limited here.

In some embodiments, the first control in the form of a fixed function button may be disposed in an edge area of the video playing interface. For example, it may be disposed in a function bar or toolbar on any of the upper, lower, left, and right sides of the video playing interface, and the specific arrangement manner is not limited. In addition, the first control in the form of the fixed function button may be disposed above the video playing interface.

Figure 3:
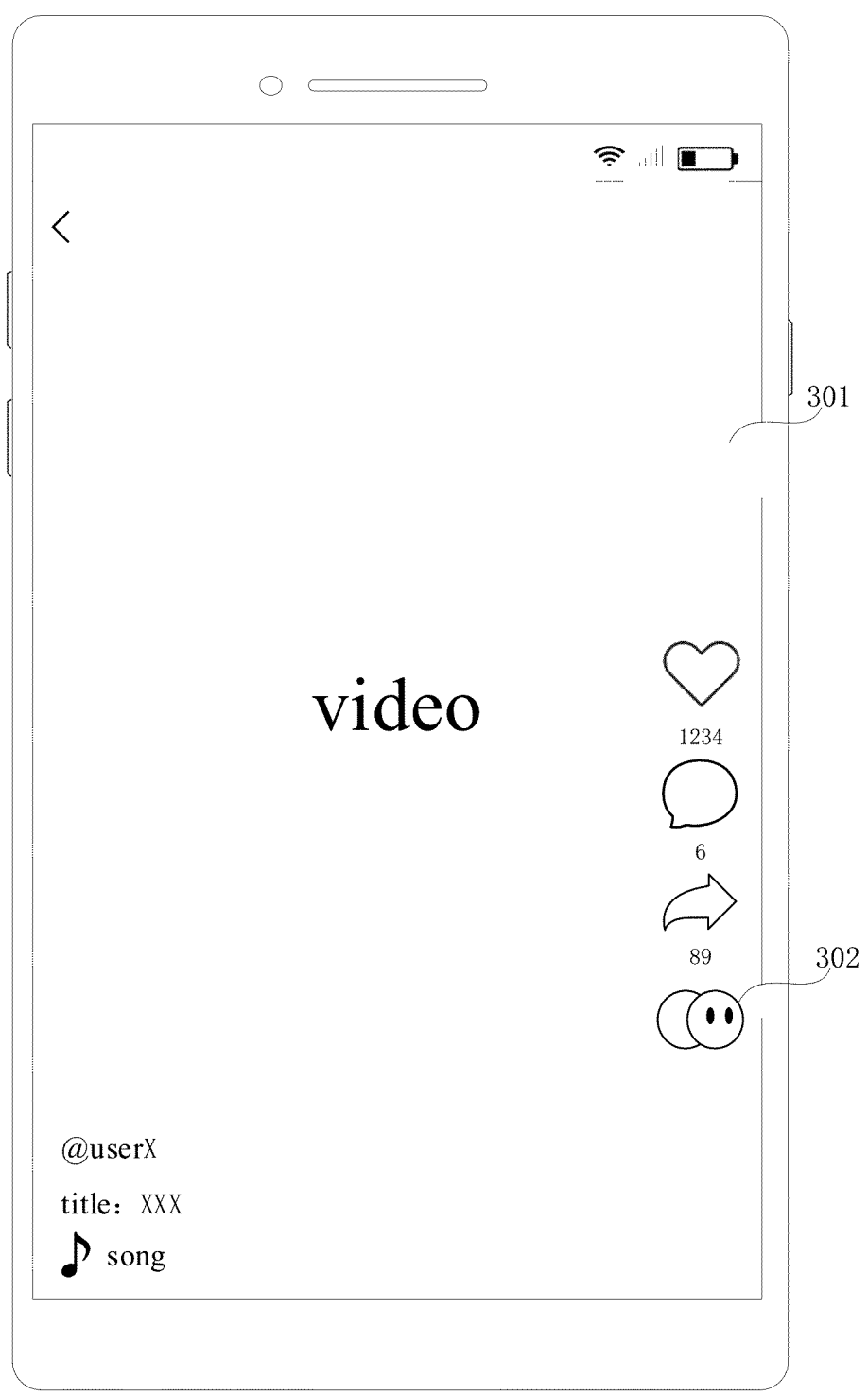
FIG. 3 is a schematic diagram illustrating a video playing interface provided by an embodiment of the present disclosure.

Illustratively, FIG. 3 shows a schematic diagram of a video playing interface provided by an embodiment of the present disclosure. As shown in FIG. 3, a fixed first control 302 is displayed on the right side of the video playing interface 301. In some embodiments, the first control 302 may be a trigger control with a co-shooting function.

Figure 4:
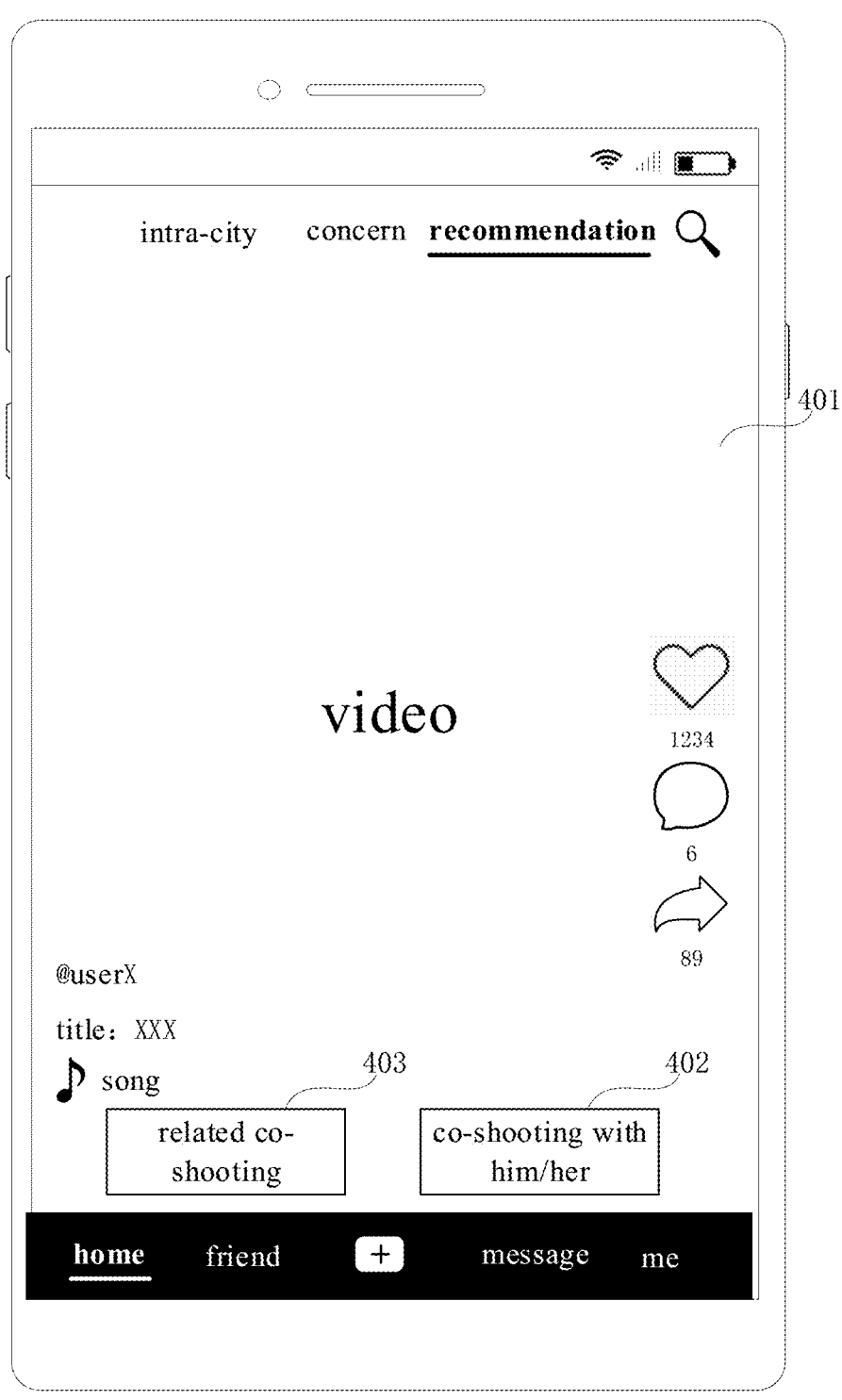
FIG. 4 is a schematic diagram illustrating another video playing interface provided by the embodiment of the present disclosure.

For further illustration, FIG. 4 shows a schematic diagram of another video playing interface provided by an embodiment of the present disclosure. As shown in FIG. 4, a first control 402 is displayed on the lower side of the video playing interface 401. In some embodiments, the first control 402 may be a trigger control with a co-shooting function. In some embodiments, the first control 402 may also be displayed when it is determined that there is an interactive video corresponding to a video released by a user to which the currently played video belongs, or the number of existing interactive videos is larger than a preset number threshold. The interactive video can be a co-shot video of a video recorded by another user and a video released by a user to which the currently played video belongs. The preset number threshold may be set according to an actual scenario and specific requirements, and is not limited here.

In one example, with continued reference to FIG. 4, to facilitate a user to quickly view a related interactive video of a currently played video, a view control 403 of the related interactive video may be displayed on the video playing interface 401. By triggering the viewing control 403, the user may display a co-shot video of the currently played video and the video recorded by another user, or may display a co-shot video of each video of the user to which the currently played video belongs and the video recorded by another user, which is not particularly limited here.

In some embodiments, the menu control corresponding to the dropdown menu option may be disposed in an edge area of the video playing interface. For example, it may be disposed in a function bar or toolbar on any one of the upper, lower, left, and right sides of the video playing interface, and the specific setting manner is not limited. In addition, the menu control can be disposed above the video playing interface.

In some embodiments, after the user triggers a menu control corresponding to the dropdown menu option, a dropdown menu corresponding to the menu control may be displayed, where the dropdown menu may include a plurality of dropdown menu options. Illustratively, the dropdown menu may be displayed in a superimposed manner on top of the video playing interface.

Figure 5:
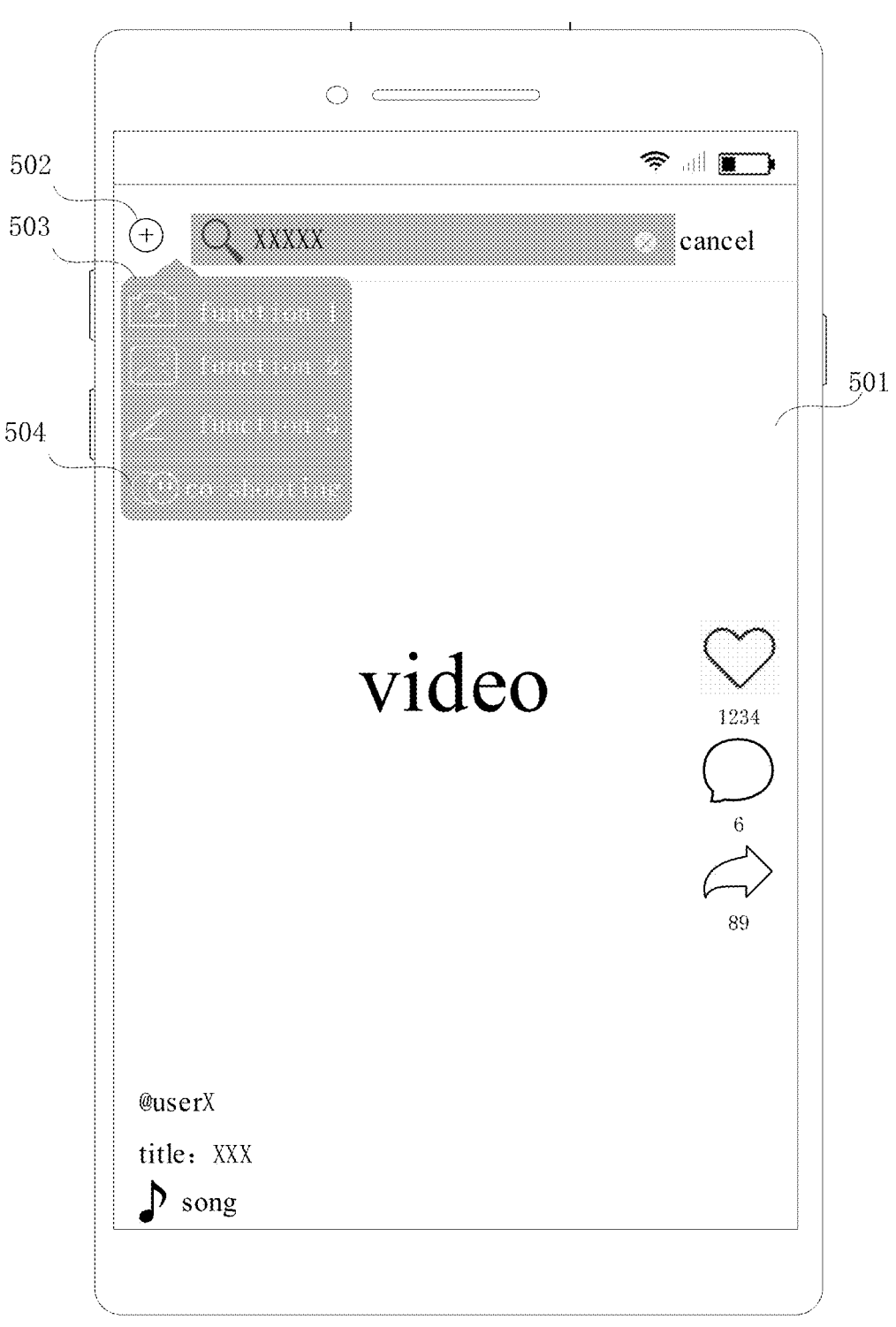
FIG. 5 is a schematic diagram illustrating another video playing interface provided by the embodiment of the present disclosure.

Illustratively, FIG. 5 shows a schematic diagram of another video playing interface provided by an embodiment of the present disclosure. As shown in FIG. 5, a menu control 502 is displayed on the upper side of the video playing interface 501, and after the user triggers the menu control 502, a dropdown menu 503 is displayed below the menu control 502, where the dropdown menu 503 includes a plurality of dropdown menu options including a first control 504. The first control 504 may be a menu option with a co-shooting function.

In yet another example, where the target interactive interface comprises a social interactive interface, the first control is a recommendation option in the social interactive interface. It should be noted that the first control may also be a recommendation option of a target interactive interface, such as a user social home page, a video presentation page, and the like, which is not limited here.

In some embodiments, a first control in the form of a recommendation option may be disposed within a target display area of a social interactive interface. The target display area may be all or part of the display area of the social interactive interface, which is not limited. For example, it may be a display area in the form of a card on a social interactive interface. The recommendation option in the form of a card in the display area may be fixed or slidable, which is not particularly limited. Alternatively, the first control in the form of the recommendation option may also be in other forms, such as a fixed button, which is not limited here.

Figure 6:
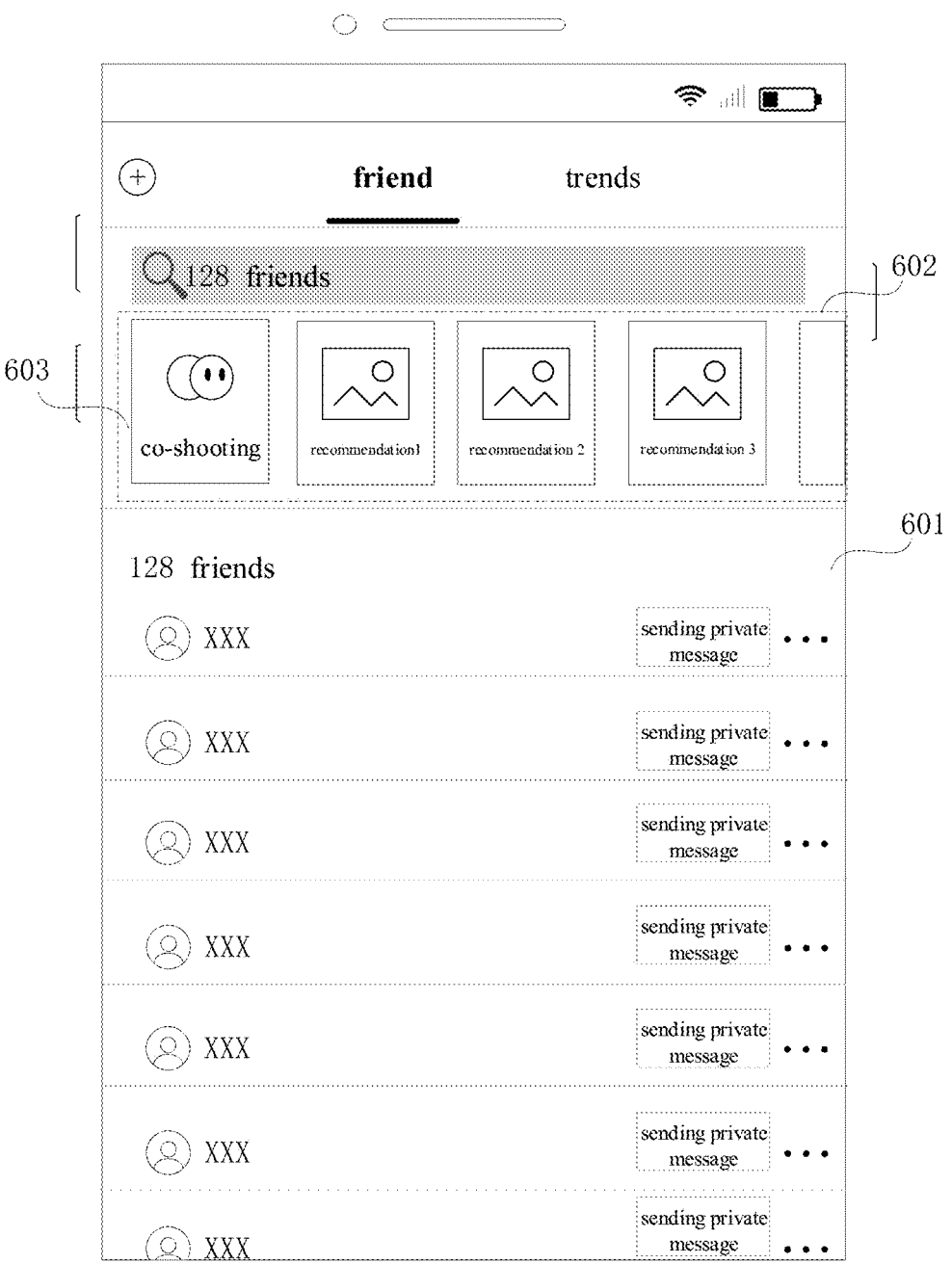
FIG. 6 is a schematic diagram illustrating a social interactive interface provided by an embodiment of the disclosure.

Illustratively, FIG. 6 shows a schematic diagram of a social interactive interface provided by an embodiment of the present disclosure. As shown in FIG. 6, a target display area 602 is displayed on the social interactive interface 601, and a plurality of recommendation options in the form of cards including a first control 603 exist in the target display area 602. The user may display different recommendation controls within the target display area 602 through a sliding operation, such as a left slide, a right slide, and so forth. The user may click on the recommendation option corresponding to the first control 603 to trigger display of the first content list and/or the second content list. The first control 603 may be a recommendation control with a co-shooting function.

In step S120, in response to a first trigger operation on a first control, a candidate content list is determined, wherein each candidate content in the candidate content list satisfies a preset screening condition.

In the embodiment of the disclosure, when a user wants to execute a function corresponding to the first control, for example, the user wants to record content fused with other contents, a first trigger operation may be performed on the electronic device.

For example, the first trigger operation may include, without limitation, a gesture control operation such as a click, a double click and a long press, a voice control operation, or an expression control operation on the first control.

In some embodiments, the candidate content may be candidate content recorded and released by each user on the target application platform, uploaded by each user to the target application platform, or obtained by the target application platform from a network. In some embodiments, the candidate content may include video, audio, and other content that the user may release to the target application platform, which is not particularly limited. In one example, the candidate content may be original content recorded by the user, which is not particularly limited.

In some embodiments, the preset screening condition is used for screening out candidate contents which can be used as fused objects from a content library. The video to be screened from the content library may be content recorded by a user, content uploaded by a user from a local storage device, or content acquired from another application platform or a web page, which is not particularly limited. In addition, it should be noted that the candidate content may also be content of interest to the user determined according to historical viewing data of the user, or may also be content that has a correlation with the user or content that has a correlation with the historical content recorded by the user, which is not specifically limited here.

In some embodiments, the preset screening condition may include: the number of interactive contents is larger than or equal to a first threshold value, and/or, the number of the interactions corresponding to each candidate content is larger than or equal to a second threshold value. The first threshold value and the second threshold value may be set according to an actual scenario and specific requirements, and they may be the same or different, which is not specifically limited. In some embodiments, the first threshold value and the second threshold value may be preset values, or may be determined according to the number of interactive contents or the number of interactions corresponding to the contents of the top preset number/top preset percentage in the content library, which are ranked in a descending order based on the number of interactive contents or the number of interactions.

In one example, interactive content refers to content that interacts in content with specific content of each candidate content. Illustratively, the interactive content may be a video containing all or part of the contents, or all or part of the content elements, of the candidate content. Wherein the content element may be audio of the candidate content, or the like. For example, the interactive content may be fused content obtained by fusing the candidate content with other content, where the number of the interactive contents is the number of the obtained fused contents; for example, the number of co-shot videos generated by co-shooting the candidate content, and for example, the number of audios of the candidate content used by another user for generating videos. In another example, the number of interactions may be the number of interactions between other users and each candidate content, such as the number of forwarding, the number of comments, the number of likes, the number of favorites, and the like, which is not limited in particular.

Specifically, if the preset screening condition includes that the number of interactive contents is larger than or equal to a first threshold value, correspondingly, each candidate content satisfies the preset screening condition including the number of interactive contents corresponding to each candidate content is larger than or equal to the first threshold value. That is, the number of interactive contents of the candidate contents in the candidate content list is larger than or equal to the first threshold value.

In some embodiments, for candidate contents corresponding to a first type, that is, candidate contents belonging to the first contents, each candidate content satisfies the preset screening condition including the number of interactive contents corresponding to each first content is larger than or equal to a third threshold value. Illustratively, for an original video belonging to a co-shot video as an example, the preset candidate condition may be that an accumulated number of times of co-shooting of the original video for the co-shot video is larger than or equal to 300 (times).

In some embodiments, for candidate contents corresponding to a second type, that is, candidate contents belonging to the second contents, the preset screening condition includes that the number of interactive contents corresponding to each second content is larger than or equal to a fifth threshold value. Illustratively, for an original video belonging to a co-sung video as an example, the preset candidate condition may be that an accumulated number of times of co-shooting of the original video for the co-sung video is larger than or equal to 100 (times).

It should be noted that the third threshold value and the fifth threshold value may be set according to a specific scenario and an actual demand, which is not limited herein. The values of the third threshold and the fifth threshold may be the same or different, which is not limited here.

Specifically, if the preset screening condition includes that the number of interactions is larger than or equal to a second threshold value, correspondingly, each candidate content satisfies the preset screening condition including the number of interactions corresponding to each candidate content is larger than or equal to the second threshold value. That is, the number of interactions of the candidate contents in the candidate content list is larger than or equal to the second threshold value.

In some embodiments, for candidate contents corresponding to the first type, that is, candidate contents belonging to the first contents, each candidate content satisfying the preset screening condition including the number of interactions corresponding to each first content is larger than or equal to a fourth threshold value. For example, for an original video belonging to a co-shot video, the preset candidate condition may be that an accumulated number of times of likes of the original video for the co-shot video is larger than or equal to the fourth threshold value.

In some embodiments, for candidate contents corresponding to the second type, that is, candidate contents belonging to the second contents, the preset screening condition includes that the number of interactions corresponding to each second content is larger than or equal to a sixth threshold value. For example, for an original video belonging to a co-sung video, the preset candidate condition may be that an accumulated number of times of the co-shooting of the original video for the co-sung video is larger than or equal to the sixth threshold value.

It should be noted that the fourth threshold value and the sixth threshold value may be set according to a specific scenario and an actual demand, which is not limited herein. The values of the fourth threshold and the sixth threshold may be the same or different, which is not limited here.

In step S130, a first content list and a second content list are determined based on a candidate content list according to content features of the respective candidate contents and/or interactive contents corresponding to the respective candidate contents. Each first content in the first content list corresponds to a first type, and each second content in the second content list corresponds to a second type.

In the embodiment of the disclosure, after determining the candidate content list and the content features of each candidate content in the candidate content list and/or the content features of the interactive content corresponding to each candidate content, the electronic device may correspondingly determine the first content list and the second content list. It should be noted that, more types (for example, types in addition to the first type and the second type) may be determined according to the content features of the candidate content and the actual needs of the user, and a content list corresponding to each of the multiple types may be determined, which is not limited in the embodiment of the disclosure.

In the embodiment of the disclosure, after determining the candidate content list, the content features of each candidate content and/or the content features of the interactive content corresponding to each candidate content are extracted first.

In some embodiments, the content features may be feature attributes that can reflect the content in one or more feature dimensions. Specifically, the content feature includes at least one of a type feature, an interaction feature, a popularity feature, and a release time feature. It is to be noted that the content feature may be other features capable of classifying candidate contents, which is not limited here.

Taking the candidate content is a video as an example, the type feature is used for characterizing the type of the candidate video. Illustratively, where the content features include a type feature, the type feature may be obtained from content understanding on images or textual content of the video. For example, it may be determined based on video-related text of the candidate content. The video-related text can be extracted from data that contains classification information, such as the text title, the cover text, the topic of interest, the words in the video frame image of the candidate content. Alternatively, the video-related text may also be a keyword extracted from the content of comments given by a viewing user on the candidate content. In another example, the type feature may be determined according to the background music or video content of the candidate content, which is not particularly limited. In a further example, the type feature may also be determined according to a control in the candidate content, such as two types including commodity information and commodity-free information, which is not limited in particular.

Illustratively, the type feature of the video may be a first type which is a material of a co-shot video or a second type which is a material of a co-sung video. In some embodiments, candidate content that is suitable as a material of a co-sung video may be taken as a co-sung material. Illustratively, video-related text of the candidate content and/or video-related text of the interactive content corresponding to the candidate content may be utilized to determine whether the candidate content and the interactive content corresponding to the candidate content belong to co-sung video or a co-shot video. For example, if a text title, a cover text, a topic of interest, and a word in a video frame image of the co-shot video includes the wording like "singing", the co-shot video and an original video corresponding to the co-shot video may be classified as co-sung videos.

It should be noted that, the type feature may be other type features capable of classifying the candidate content into multiple types, which is not limited herein. In some embodiments, a fused video that is required to exhibit a sound coordination effect of the candidate content with other content may be used as a co-sung video. A fused video that is required to exhibit an image content matching effect of the candidate content with other content, a fused video that is required to exhibit image content and sound coordination effect of the candidate content with other content can be used as a co-shot video.

In some embodiments, the interaction feature may be extracted according to interaction information of the viewing user and the candidate content, such as a number of forwarding, a number of comments, a number of likes, a number of favorites, and the like, which is not limited here.

Illustratively, in a case where the content features include interaction features, either one of the first type and the second type may be more interactive content, and the other one of the first type and the second type may be less interactive content.

In some embodiments, the popularity feature may be obtained according to data capable of reflecting the popularity of the candidate content, such as an accumulated viewing amount, times of searching, and the like, which is not limited here.

Illustratively, in a case where the content features include popularity features, either one of the first type and the second type may be content with higher popularity, and the other one of the first type and the second type may be content with lower popularity.

In some embodiments, the release time feature may characterize specific time information on the user's release of the candidate content.

Illustratively, in a case where the content features include a release time feature, either one of the first type and the second type may be content whose release time is recent, and the other one of the first type and the second type may be content whose release time is early.

In some embodiments, to enhance the user's experience in browsing contents, the first content may comprise: candidate content corresponding to the first type, and/or associated content corresponding to the candidate content of the first type. Wherein the associated content may be content outside the candidate content list. In some embodiments, in order to improve the quality of the first content, associated content meeting a preset condition may be selected from a plurality of associated contents corresponding to the candidate content of the first type as the first content. For example, the first content may be selected according to factors including interactive data, popularity data and shooting quality of the associated content.

The content associated with the candidate content may be one or more of content-related, type-related, interactive data-related, and the like.

In some embodiments, the content associated with the candidate content may be fused content fused with the candidate content. Specifically, the candidate content is original content, and the first content includes original content corresponding to a first type and/or fused content corresponding to the original content corresponding to the first type. Wherein the original content may be content that the user has released to a target application platform. The fused content may be fused content obtained by splicing content recorded by a user of the electronic device and the original content. For example, the original content may be an original video, and the fused content may be a co-shot video of a video shot by a user of the electronic device and the original video.

It should be noted that, by using the associated content of the candidate content as the first content or the second content, while the first content belonging to the first type and/or the second content belonging to the second type are presented to the user, content other than the candidate content with a high association degree may be presented to the user so as to improve the browsing experience of the user.

In other embodiments, to enhance the user's experience in content browsing, the second content may include: candidate content corresponding to the second type, and/or associated content corresponding to the candidate content of the second type. For the associated content, the above description on the associated content with respect to the first content can be referred to, which is not repeated here.

The content associated with the candidate content may be one or more of content-related, type-related, interactive data-related to the candidate content, and the like.

In some embodiments, the content associated with the candidate content may be fused content fused with the candidate content. Specifically, the candidate content is original content, and the second content includes original content corresponding to the second type and/or fused content corresponding to the original content corresponding to the second type. Wherein the original content may be content that the user has released to a target application platform. The fused content may be a fused content obtained by splicing a content recorded by a user of the electronic device and the original content. For example, the original content may be an original video, and the fused content may be a co-sung video of a video shot by a user of the electronic device and the original video.

It should be noted that, by using the associated content of the candidate content as the second content or the second content, while the second content belonging to the second type and/or the second content belonging to the second type may be presented to the user, content other than the candidate content with a high association degree may be presented to the user, so as to improve the user's browsing experience.

In step S140, a first content list and/or a second content list are displayed.

In the embodiment of the disclosure, after determining the first content list and the second content list, the electronic device may present the first content list and/or the second content list according to user needs or actual conditions.

In some embodiments, the contents in the first content list and the second content list may be ranked by one or more of relevance between videos, video popularity, and interaction data.

For example, in a case where the candidate video is original content, with respect to the first content list and the second content list, if a single content list includes multiple original contents and fused contents of the multiple original contents, the original contents and the fused contents of the original contents may be adjacently arranged, and the original contents may be ranked according to the video popularity and/or the interaction data.

In some embodiments, while the first content list and the second content list are displayed, the first content list and the second content list may be displayed in different areas on the same display interface or in the same area of the same display interface. For example, the corresponding content list may be displayed when the user triggers the corresponding list display tag.

Figure 7:
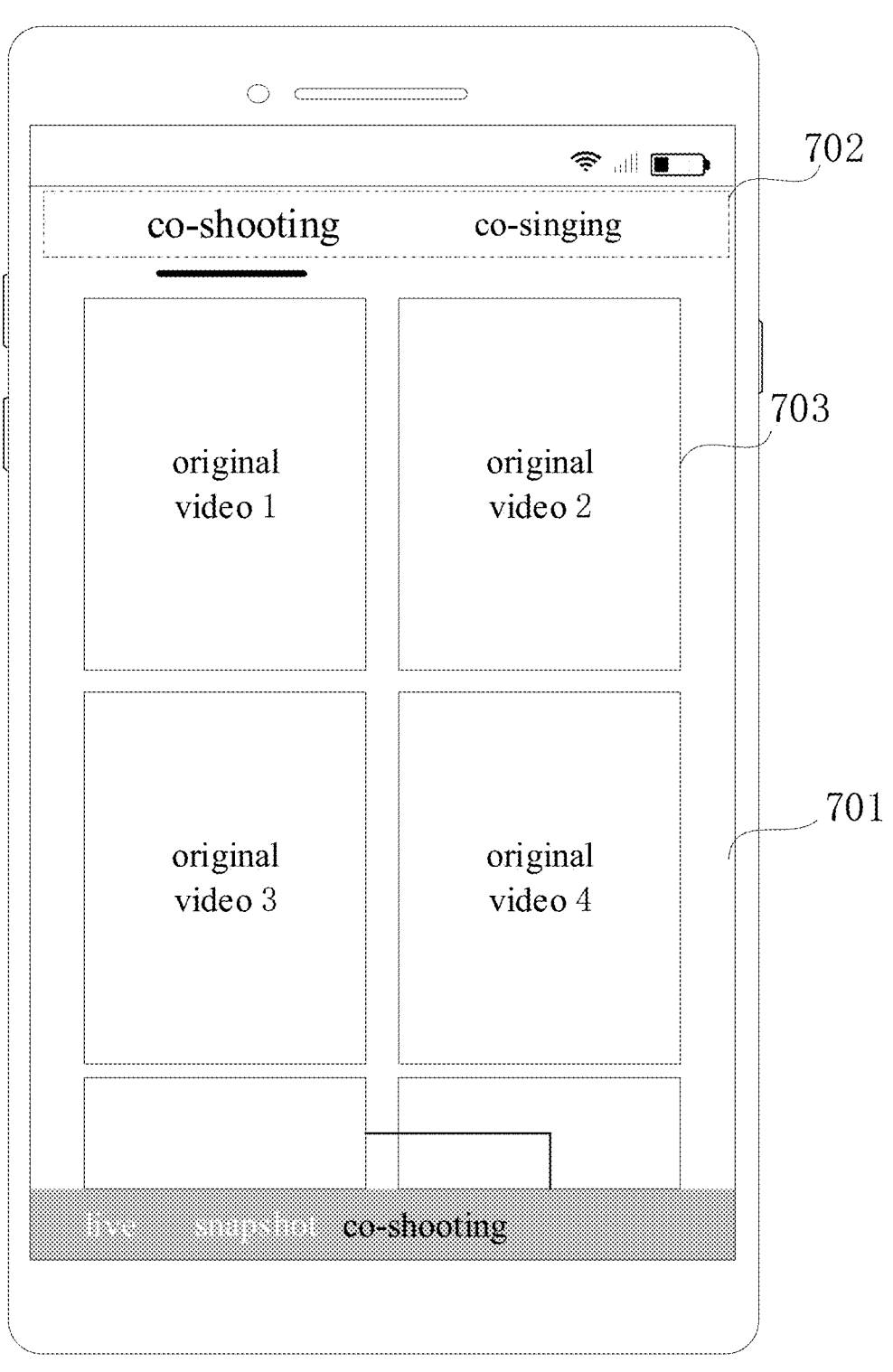
FIG. 7 is a schematic diagram illustrating a first content list provided by an embodiment of the disclosure.

In one example, FIG. 7 illustrates a schematic diagram of a first content list provided by an embodiment of the present disclosure. As shown in FIG. 7, a list display tag area 702 and a list content display area 703 are displayed on a display interface 701 of the electronic device.

Wherein the co-shooting and co-singing correspond to the first type and the second type, respectively.

When the user triggers a co-shooting display tag in the list display tag area 702, a first content list corresponding to the co-shooting function may be correspondingly displayed in the list content display area 703. As shown in FIG. 7, the first content list may include a plurality of original videos, such as original videos 1-4.

Figure 8:
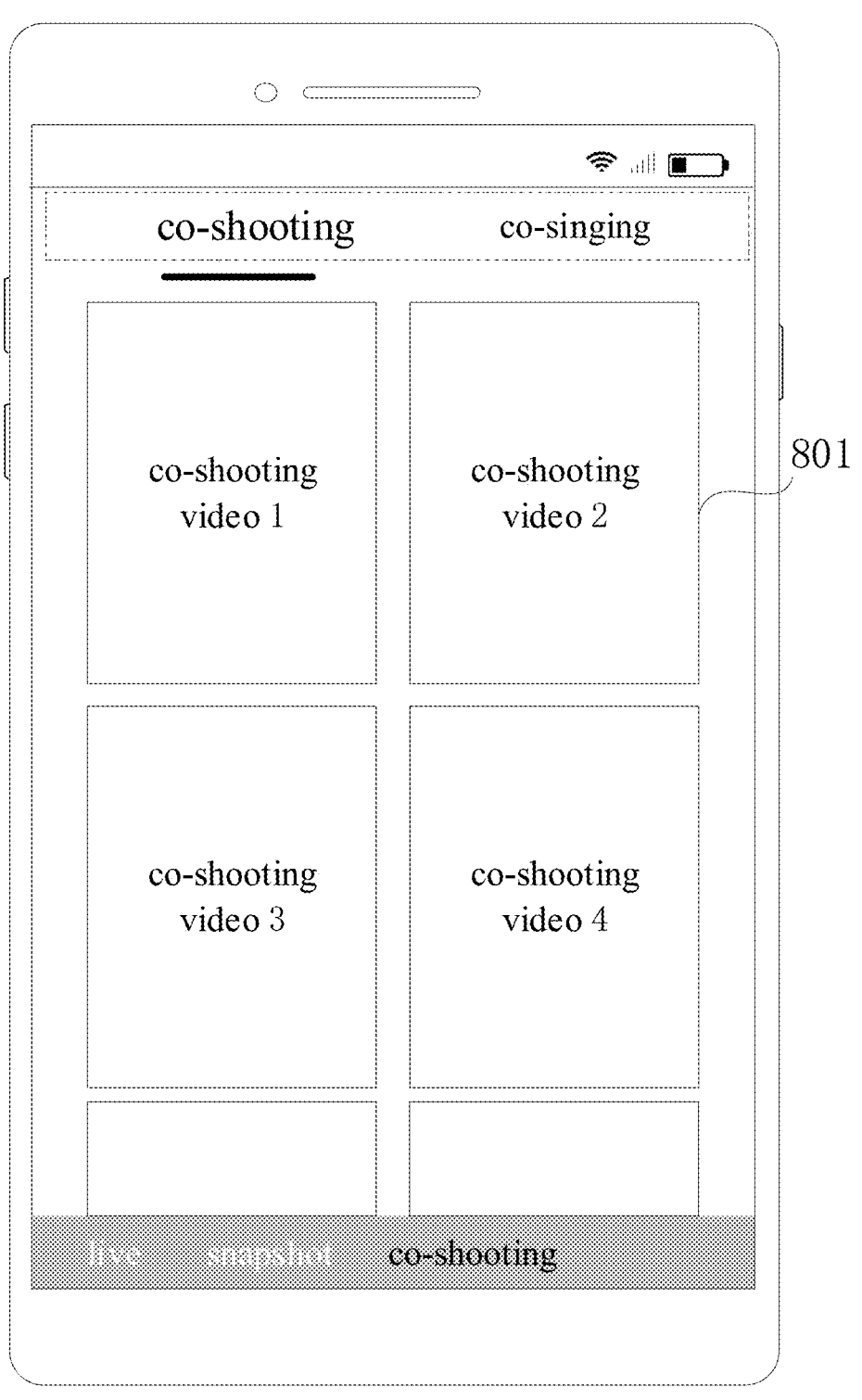
FIG. 8 is a schematic diagram illustrating another first content list provided by an embodiment of the present disclosure.

In another example, FIG. 8 illustrates a schematic diagram of another first content list provided by an embodiment of the present disclosure. As shown in FIG. 8, a first content list corresponding to co-shooting video may be correspondingly displayed in the list content display area 801. As shown in FIG. 8, the first content list may include a plurality of co-shot videos, such as co-shot videos 1-4.

In yet another example, the first content list may also display the original video and the co-shot video, which is not particularly limited.

Figure 9:
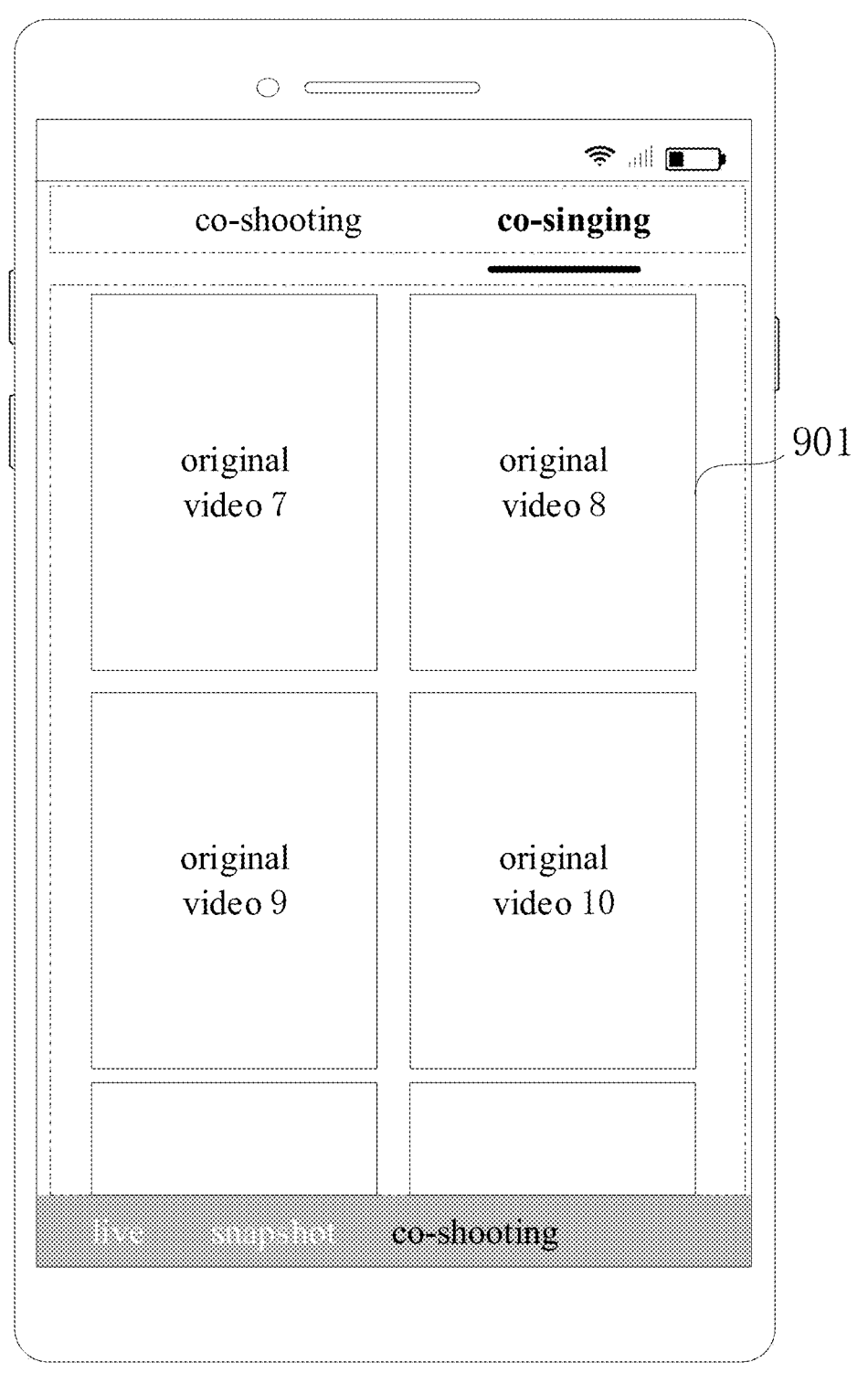
FIG. 9 is a schematic diagram illustrating a second content list provided by an embodiment of the disclosure.

In yet another example, FIG. 9 illustrates a schematic diagram of a second content list provided by an embodiment of the present disclosure. When the user triggers the co-sing display tag in the list display tag area 702, a second content list corresponding to the co-singing function may be correspondingly displayed in the list content display area 901. As shown in FIG. 9, the second content list may include a plurality of original videos, such as original videos 7-10.

It should be noted that the second content list may also display a co-sung video, or the co-sung video and the original video, which is not specifically limited, and the specific display method may refer to the relevant description on the co-shot video in the foregoing part of the embodiment of the present disclosure, which would not be repeated here.

According to the content display method in the embodiment of the present disclosure, after the first trigger operation of the first control displayed in the target interactive interface is received, a candidate content list including candidate contents satisfying a preset screening condition can be screened out. And then based on content features of the candidate content and/or of the interaction content corresponding to the candidate content and based on the candidate content list, a first content list containing first content of a first type and a second content list containing second content of a second type are determined, and the first content list and/or the second content list are displayed. Since the first content list and/or the second content list can be displayed based on content features of the candidate content and/or of the interaction content corresponding to the candidate content, the user can browse different types of content in different content lists when he/she needs to browse the content, thereby enabling the user to quickly screen out content and promoting the user's willingness in related content creation.

FIG. 10 is a schematic flow chart illustrating another content display method provided in an embodiment of the present disclosure. The embodiments of the present disclosure are optimized based on the above embodiments, and the embodiments of the present disclosure may be combined with various optional solutions in one or more of the above embodiments.

In the embodiment of the present disclosure, the content display method may be performed by an electronic device. Among them, the electronic device may include, but is not limited to, a mobile terminal such as a mobile phone, a laptop computer, a digital broadcast receiver, a PDA (personal digital assistant), a PAD (tablet), a PMP (portable media player), a vehicle terminal (e.g., a car navigation terminal), a wearable device, and the like, or a stationary terminal such as a digital TV, a desktop computer, a smart home device, and the like.

As shown in FIG. 10, the content display method may include the following steps S1010 to S1060.

In step S1010, a first control is displayed within a target interactive interface. S1010 is similar to S110, which would not be repeated here.

In step S1020, in response to a first trigger operation on the first control, a candidate content list is determined, wherein each candidate content in the candidate content list satisfies a preset screening condition. S1020 is similar to S120, which would not be repeated here.

In step S1030, according to content features of the candidate contents and/or the interactive contents corresponding to the candidate contents, a first content list and a second content list are determined based on the candidate content list, wherein each first content in the first content list corresponds to a first type, and each second content in the second content list corresponds to a second type. S1030 is similar to S130, which would not be repeated here.

In the step S1040, the target interactive interface is skipped to a display content recommendation interface, wherein for the display content recommendation interface, the description hereinabove in the embodiment of the present disclosure with reference to FIGS. 7 to 9 may be referred to, which would not be repeated here.

In step S1050, a first tag and a second tag are displayed in a first display area of the content recommendation interface. The first tag corresponds to the first content list, and the second tag corresponds to the second content list. For the display content recommendation interface, the description hereinabove in the embodiment of the present disclosure with reference to FIGS. 7 to 9 may be referred to, which would not be repeated here. The first display area may be the list display tag area 702 in FIG. 7, the first tag may be a tag of a co-shooting function, and the second tag may be a tag of a co-singing function.

In step S1060, the target content list is displayed in a second display area of the content recommendation interface. The target content list is a content list corresponding to the target tag in the first content list and the second content list, and the target tag is a tag in a selected state among the first tag and the second tag. For the display content recommendation interface, the description hereinabove in the embodiment of the present disclosure with reference to FIGS. 7 to 9 may be referred to, which would not be repeated here.

According to the content display method in the embodiment of the present disclosure, after the first trigger operation of the first control displayed in the target interactive interface is received, a candidate content list including candidate contents satisfying the preset screening condition can be screened out. And then a first content list containing first content of a first type and a second content list containing second content of a second type are determined based on content features of the candidate content and/or of the interactive content corresponding to the candidate content and based on the candidate content list, and the first content list and/or the second content list are displayed. Since the first content list and/or the second content list can be displayed according to the category based on the content features of the candidate content and/or of the interactive content corresponding to the candidate content, the user can browse different types of contents in different content lists when he/she needs to browse the content, thereby enabling the user to quickly screen out content and promoting the user's willingness to create related content.

FIG. 11 is a schematic flow chart illustrating a further content display method provided by an embodiment of the present disclosure. For example, the candidate content, the first content, and the second content in the content display method shown in FIG. 11 are video contents, respectively. The embodiments of the present disclosure are optimized based on the above embodiments, and the embodiments of the present disclosure may be combined with various optional solutions in one or more of the above embodiments.

In the embodiment of the disclosure, the content display method may be performed by an electronic device. Among them, the electronic device may include, but is not limited to, a mobile terminal such as a mobile phone, a laptop computer, a digital broadcast receiver, a PDA (personal digital assistant), a PAD (tablet), a PMP (portable media player), a vehicle terminal (e.g., a car navigation terminal), a wearable device, and the like, or a stationary terminal such as a digital TV, a desktop computer, a smart home device, and the like.

As shown in FIG. 11, the content display method may include the following steps S1110 to S1160.

In step S1110, a first control is displayed within the target interactive interface. S1110 is similar to S110, which would not be repeated here.

In step S1120, in response to a first trigger operation on the first control, a candidate content list is determined, wherein each candidate content in the candidate content list satisfies the preset screening condition. S1120 is similar to S120, which would not be repeated here.

In step S1130, a first content list and a second content list are determined based on the candidate content list according to content features of the candidate contents and/or the interactive contents corresponding to the candidate contents. Each first content in the first content list corresponds to a first type, and each second content in the second content list corresponds to a second type. S1130 is similar to S130, which would not be repeated here.

In step S1140, the first content list and/or the second content list are displayed. S1140 is similar to S140, which would not be repeated here.

In step S1150, in response to a second trigger operation on the displayed content list, the target content corresponding to the second trigger operation is played.

For example, the second trigger operation may include a gesture control operation such as clicking, double-clicking, long-pressing, etc., a voice control operation, or an expression control operation, etc., on the target content in the displayed content list, which is not limited herein.

In some embodiments, the target content may be content arbitrarily selected by the user in the displayed content list, which is not particularly limited.

In step S1160, in the process of playing the target content, the second control is displayed. For example, the second control is used for triggering recording of target video content, and target candidate content corresponding to the target content is fused in the target video content.

In some embodiments, the second control may be a control that triggers a content recording function, and the specific type of the second control is similar to that of the first control, which is not repeated here.

Figure 12:
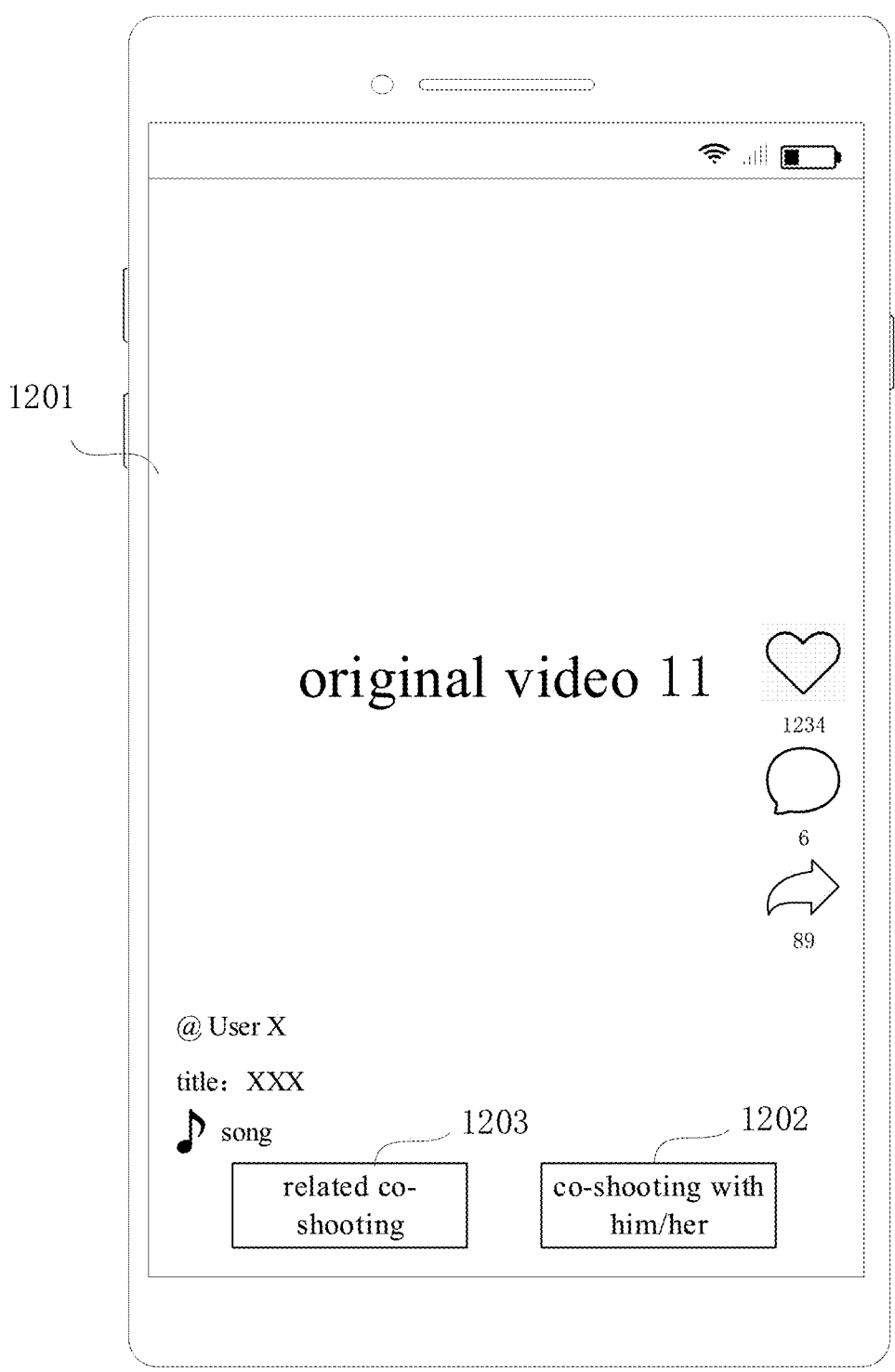
FIG. 12 is a schematic diagram illustrating a content playing page provided by an embodiment of the present disclosure.

In one example, FIG. 12 shows a schematic diagram of a content playing page provided by an embodiment of the present disclosure. As shown in FIG. 12, a second control 1202 is displayed on a content playing page 1201 of the electronic device, and a user can skip to a recording page of the target video content by clicking the second control 1202.

In some embodiments, to enhance the user's recording experience, a target element is also included in the target video content, the target element being associated with a content feature corresponding to the first type or the second type.

The target element may be a special effect element capable of modifying, covering or replacing the global or local features of the target object in the target video content, or a special effect element in which an accessory component is added to the global or local features of the target object, and may be, for example, a special effect element of a special effect tool such as a beauty tool, an image modification tool, a special effect prop tool, and the like.

In some embodiments, a preset type of characteristic may be added for a certain type of target video content. For example, in the process of shooting co-sung videos, a plurality of users often do not want to expose their faces, so when the co-sung video content is determined to be recorded through content adjustment, face covering special effects are automatically added for the users, which can improve the shooting experience of the users, improve the shooting privacy of the users, and improve the creation willingness of the users to the co-sung video.

In some embodiments, the target element associated with the content feature corresponding to the first type and the target element associated with the content feature corresponding to the second type may be the same or different, which would not be repeated here. It can be an association relationship between the target element and the content type preset by the user, or preset by the system, which is not specifically limited.

In one example, after the user enters a recording page of the target video content, a target element associated with a content feature corresponding to a type to which the target video content belongs may be determined and a facial feature of the target object may be masked with the target element.

According to the content display method, after the first trigger operation on the first control displayed in the target interactive interface is received, a candidate content list including the candidate content satisfying the preset screening condition can be screened out. And then a first content list containing first content of a first type and a second content list containing second content of a second type are determined based on content features of the candidate content and/or of the interactive content corresponding to the candidate content and based on the candidate content list, and the first content list and/or the second content list are displayed. Since the first content list and/or the second content list can be displayed according to the category based on content features of the candidate content and/or of the interactive content corresponding to the candidate content, the user can browse different types of content in different content lists when he/she needs to browse the content, thereby enabling the user to quickly screen out content and promoting the user's willingness to create related content.

In some embodiments, after S1160, the content display method further comprises the following steps A1 to A4.

In Step A1, in response to a fourth trigger operation on the second control, a first video recording interface is displayed. The first video recording interface comprises a first interface area and a second interface area, the first interface area for recording video contents, and the second interface area for displaying target candidate contents.

In some embodiments, the fourth trigger operation may include a gesture control operation such as a click, a double click, a long press or the like, a voice control operation, or an expression control operation, etc. on the second control, which is not limited here.

In some embodiments, in a case where the target content is original content, the target candidate content may be the original content. In a case where the target content is fused content, the target candidate content may be the original content corresponding to the fused content.

Figure 13:
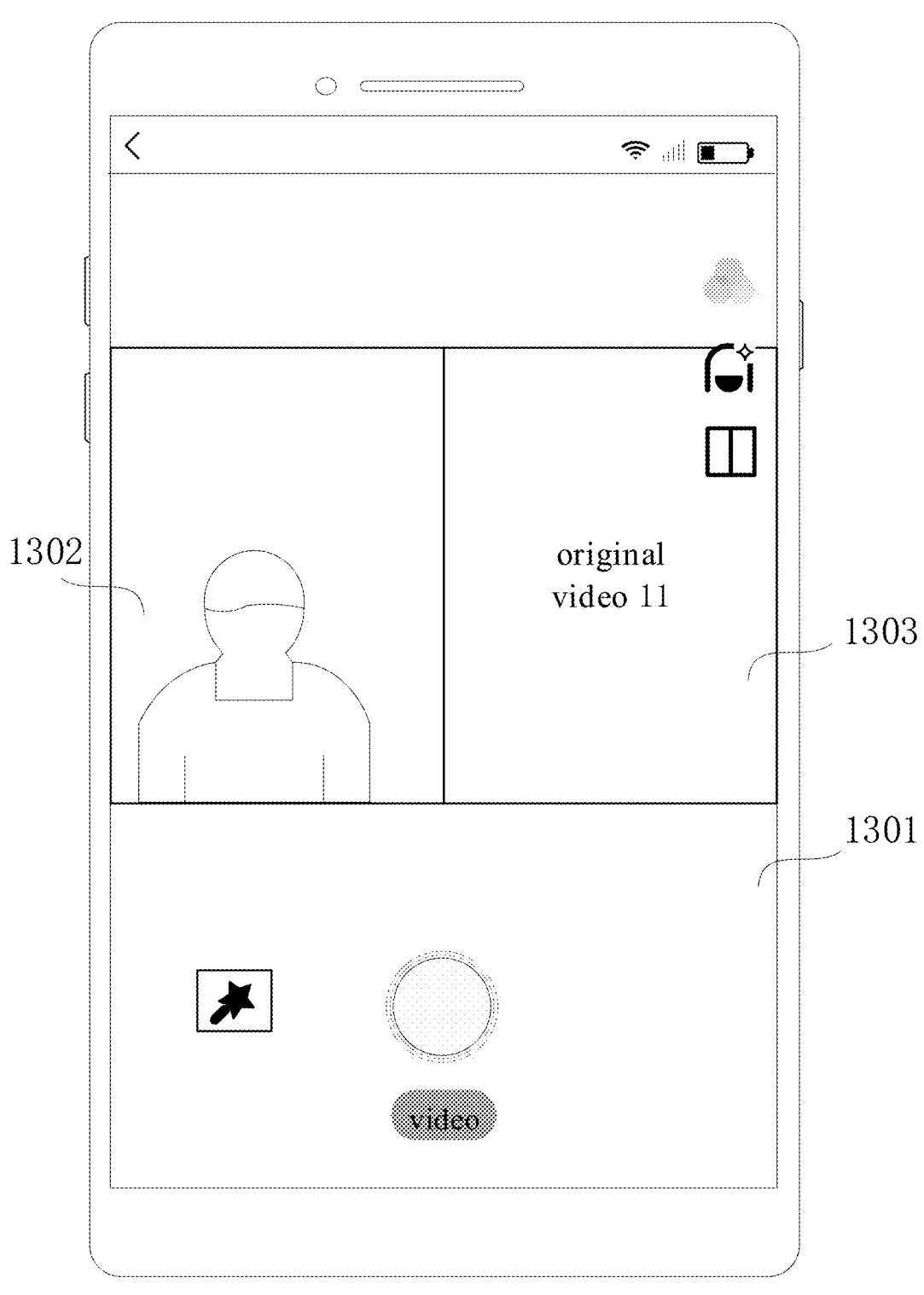
FIG. 13 is a schematic diagram illustrating a first video recording interface provided by an embodiment of the present disclosure.

With continued reference to FIG. 12, after the user triggers the second control 1202 on the play page of the original video 11, the first video recording interface shown in FIG. 13 may be displayed. FIG. 13 shows a schematic diagram of a first video recording interface provided in an embodiment of the present disclosure. As shown in FIG. 13, a first video recording interface 1301 may include a first interface area 1302 and a second interface area 1303.

The first interface area 1302 is used for recording video contents, and may display a video preview interface of a video being shot, and the second interface area 1303 is used for displaying an original video 11.

In some embodiments, the first interface area and the second interface area may be displayed in a left-right arrangement or a top-bottom arrangement, or one of the first interface area and the second interface area may be located in the other, and the specific arrangement is not limited. In one example, the arrangement of the two interface areas may be preset, or modified by triggering the corresponding arrangement control on the first video recording interface by the user.

In Step A2, a target element is obtained.

In some embodiments, the target element may be a target element corresponding to the target video content that is automatically selected by the electronic device after the electronic device opens the first video recording interface.

In other embodiments, the target element may be a target element for correspondingly adding the selected special effect item to a target object of the recorded video content based on a selection operation by the user for the special effect item on the first video recording interface.

It should be noted that other contents of the target element may refer to the related description hereinabove in the embodiments of the present disclosure, which would not be repeated here.

In Step A3, in the process of recording the video content, the target object is used to shield the target element in the first interface area.

In some embodiments, the target element may be automatically selected and correspondingly added to the recorded video content after the first video recording interface is opened.

In other embodiments, the target element may be added to the corresponding target object after the user selects the target element.

The target element may modify the global or local features of the target object or add a special effect element, and the specific adding manner is not limited. Illustratively, special effect elements may be added to the face of the target object, or original contour feature data of the face of the target object may be modified, such as big eye effect, skin abrasion, and the like.

Illustratively, with reference to FIG. 13, the user enters a co-singing recording interface, i.e., a first video recording interface, in a video playing interface in which the candidate content is a co-singing type. The first video recording interface is shown in FIG. 14.

Figure 14:
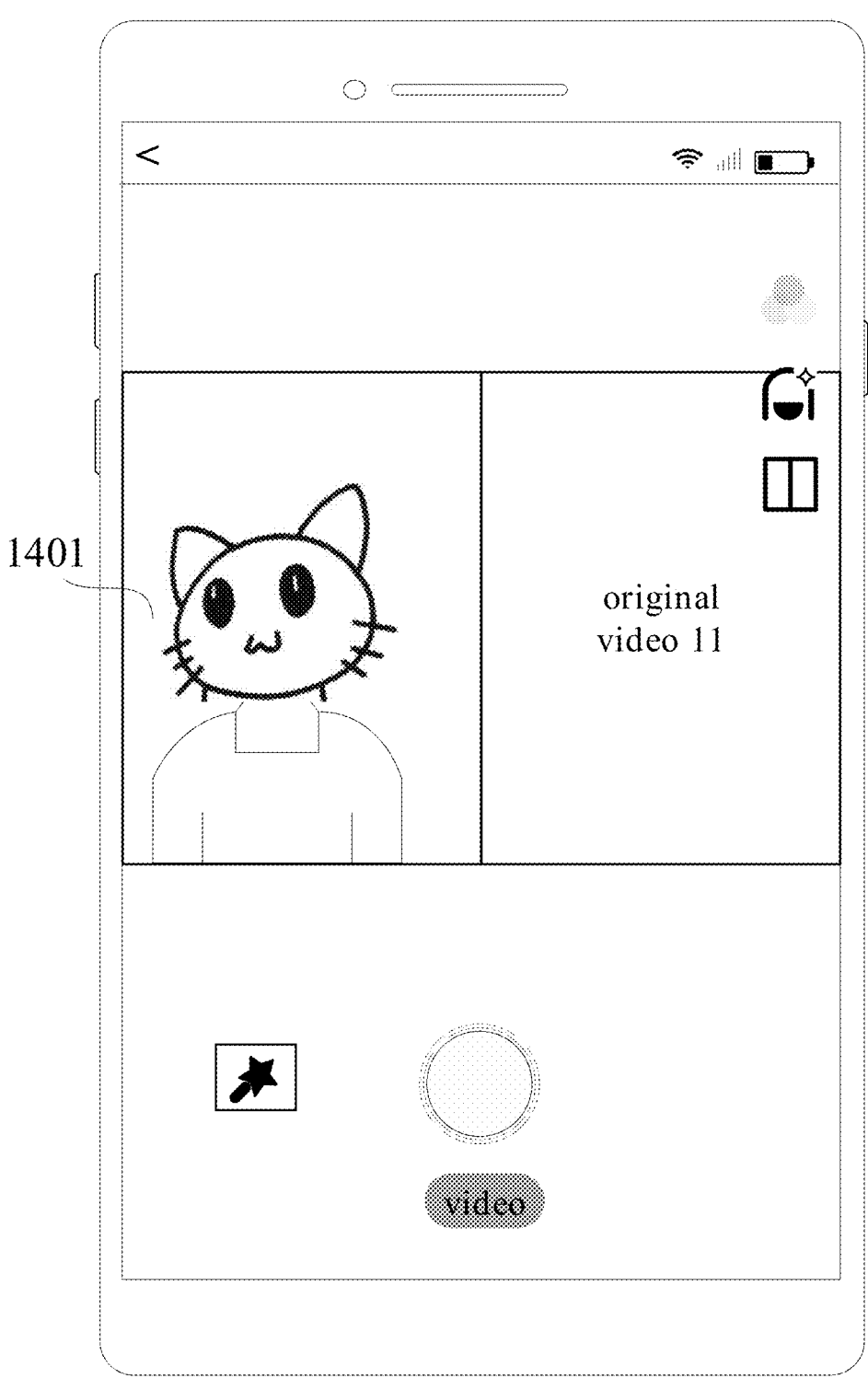
FIG. 14 is a schematic diagram illustrating a first video recording interface provided by an embodiment of the present disclosure.

FIG. 14 shows a schematic diagram of a first video recording interface provided in an embodiment of the present disclosure. The target object in the first interface area is shielded with a special effect of cat head, and the video content after the special effect shielding is shown as 1401 in FIG. 14. In other embodiments, a prompt control "click to switch the special effect" may be displayed on the interface, so that when the user is not satisfied with the special effect of cat head, other special effects of the shielding type are provided for the user to change.

In Step A4, when the recording of the video content is finished, a target video content is generated by using the video content and the target candidate content. In some embodiments, the target video content may be obtained by splicing the video content and the target candidate content, or by image fusion. The content may obtained by fusing complete contents of the video content and the target candidate content, or by fusing a part of elements or objects of the two, which would not be limited specifically.

Figure 15:
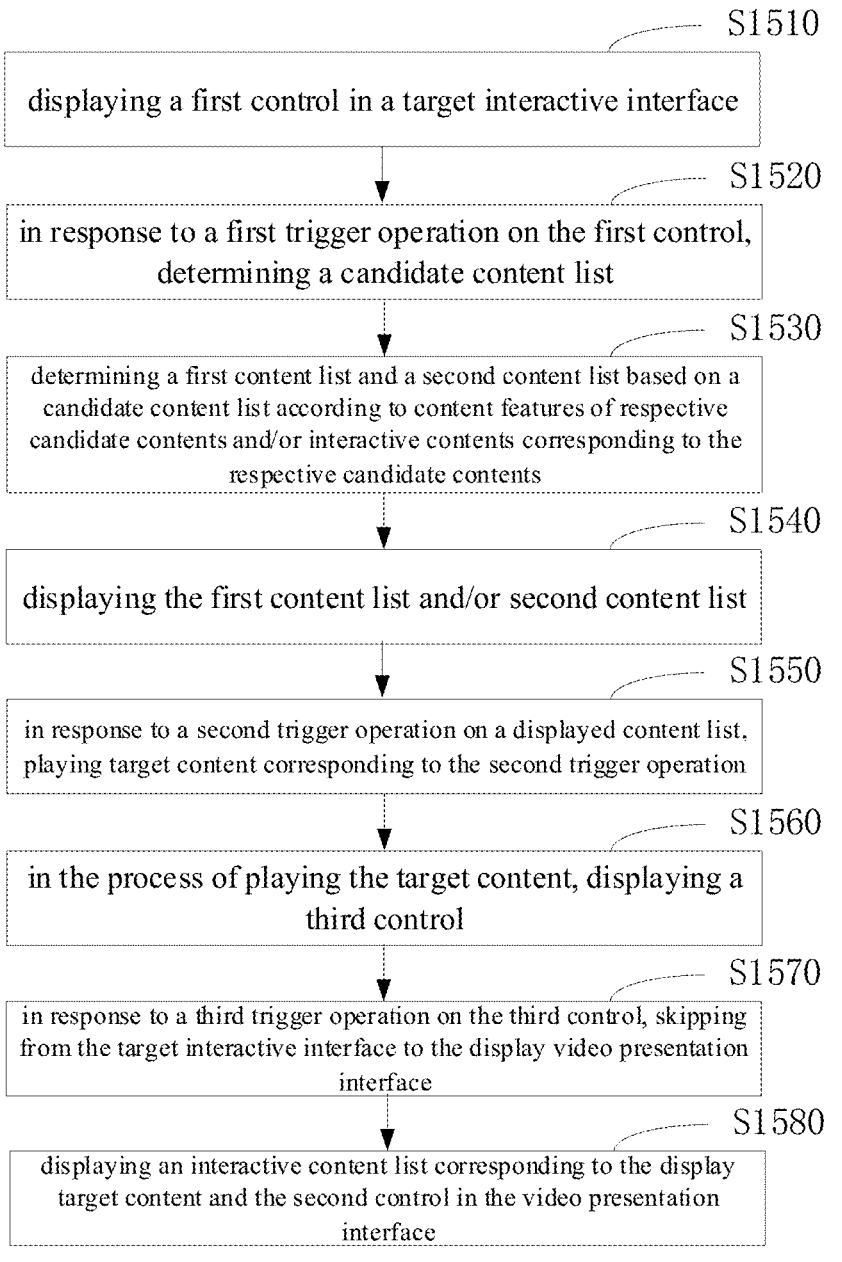
FIG. 15 is a flow chart illustrating a further content display method according to an embodiment of the disclosure.

FIG. 15 is a flow chart illustrating a further content display method provided by an embodiment of the present disclosure. For example, the candidate content, the first content, and the second content in the content display method shown in FIG. 15 are video contents, respectively. The embodiments of the present disclosure are optimized based on the above embodiments, and the embodiments of the present disclosure may be combined with various optional solutions in one or more of the above embodiments.

In the embodiment of the disclosure, the content display method may be performed by an electronic device. Among them, the electronic device may include, but is not limited to, a mobile terminal such as a mobile phone, a laptop computer, a digital broadcast receiver, a PDA (personal digital assistant), a PAD (tablet), a PMP (portable media player), a vehicle terminal (e.g., a car navigation terminal), a wearable device, and the like, or a stationary terminal such as a digital TV, a desktop computer, a smart home device, and the like.

As shown in FIG. 15, the content display method may comprise the following steps S1510 to S1580.

In step S1510, a first control is displayed within a target interactive interface. S1510 is similar to S110, which would not be repeated here.

In step S1520, in response to a first trigger operation on a first control, a list of candidate contents is determined. Each candidate content in the candidate content list satisfies the preset screening condition. S1520 is similar to S120, which would not be repeated here.

In step S1530, the first content list and the second content list are determined based on the candidate content list according to content features of the respective candidate contents and/or the interactive contents corresponding to the respective candidate contents. Each first content in the first content list corresponds to a first type, and each second content in the second content list corresponds to a second type. S1530 is similar to S130, which would not be repeated here.

In step S1540, the first content list and/or the second content list are displayed. S1540 is similar to S140, which would not be repeated here.

In step S1550, in response to a second trigger operation on the displayed content list, the target content corresponding to the second trigger operation is played. S1550 is similar to S1150, which would not be repeated here.

In step S1560, in the process of playing the target content, a third control element is displayed.

In some embodiments, the third control may be a control for triggering a video display function, and the specific type of the third control is similar to that of the first control, which would not be repeated here.

In some embodiments, with reference to FIG. 12, the third control may be a third control 1203 of a content playing page 1201.

In step S1570, in response to a third trigger operation on the third control, the target interactive interface skips to the display video presentation interface.

For example, the third trigger operation may include a gesture control operation such as a click, a double click, a long press, or the like, a voice control operation, or an expression control operation, and the like on the third control, which is not limited here.

In step S1580, a second control and an interactive content list corresponding to the target content are displayed in the video display interface, and each interactive content in the interactive content list is fused with the target candidate content.

Figure 16:
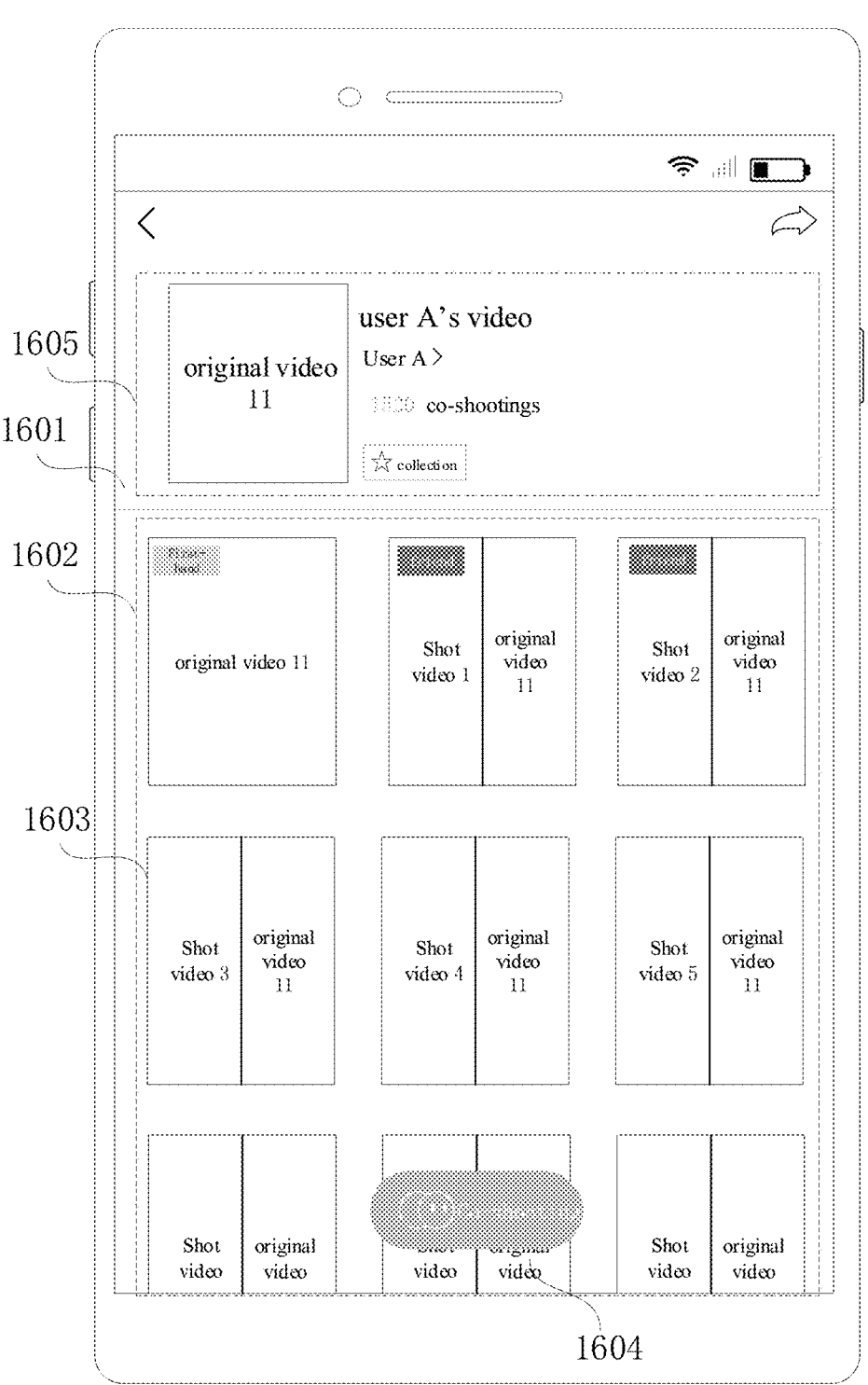
FIG. 16 is a schematic diagram illustrating a video presentation interface provided by an embodiment of the present disclosure.

In one example, with reference to FIG. 12, after the user triggers a third control 1203 for presenting the relevant co-shot content of the original video 11 on a content playing page 1201 of the original video 11 of FIG. 12, a video presentation interface shown in FIG. 16 is displayed on the electronic device.

FIG. 16 is a schematic diagram illustrating a video presentation interface provided by an embodiment of the present disclosure. As shown in FIG. 16, an interactive content list 1602 is displayed on a video presentation interface 1601 of the electronic device, where the interactive content list 1602 includes a plurality of co-shot videos 1603 of the original video 11, that is, includes a plurality of interactive contents, and, the interactive content list 1602 is also displayed with a second control 1604.

In some embodiments, to facilitate the user for co-shooting or to view the original video, the original video 11 is also displayed within the interactive content list 1602. In one example, for ease of distinction, the cover of the original video 11 may be tagged, such as with the textual character "first-hand". Illustratively, to enhance the user's browsing experience, a co-shot video that is highly relevant to the user or is of the user's interest may be preferentially presented, such as a co-shot video of a user's friends with the original video 11. For ease of distinction, a tag, such as a textual tag "friend", may be added to the cover of the co-shot video of the friend of the user with the original video 11.

In some embodiments, to facilitate user operation, an information presentation area 1605 of the original video 11 is also displayed on the video presentation interface 1601. Information related to the original video 11 is presented in the information display area 1605, such as the related user information of the original video 11, the skip link of the social home page of the related user, and information on the number of interactive contents, such as an accumulated number of times of co-shooting of the original video 11.

In some embodiments, to facilitate user operation, a collection button for the original video 11 is presented on the video presentation interface 1601 to facilitate user to collect videos of interest.

In some embodiments, the target video content further includes a target element therein, the target element being associated with either the first type or the second type. For the target element, reference may be made to the related description hereinabove in the embodiment of the present disclosure, which would not be repeated here.

In some embodiments, after step S1580, the content display method further comprises Steps A1 to A4 described above. The relevant description hereinabove in the embodiments of the present disclosure may be referred to, which would not be repeated here.

According to the content display method in the embodiment of the disclosure, after the first trigger operation on the first control displayed in the target interactive interface is received, a candidate content list including candidate contents satisfying the preset screening condition can be screened out. And then a first content list containing first content of a first type and a second content list containing second content of a second type are determined according to content features of the candidate content and/or of the interactive content corresponding to the candidate content and based on the candidate content list, and the first content list and/or the second content list are displayed. Since the first content list and/or the second content list can be displayed according to the category based on content features of the candidate content and/or of the interactive content corresponding to the candidate content, the user can browse different types of contents in different content lists when he/she needs to browse the content, thereby enabling the user to quickly screen out content and promoting the user's willingness to create related content.

The embodiment of the present disclosure also provides a content display apparatus, which is described below with reference to FIG. 17.

Figure 17:
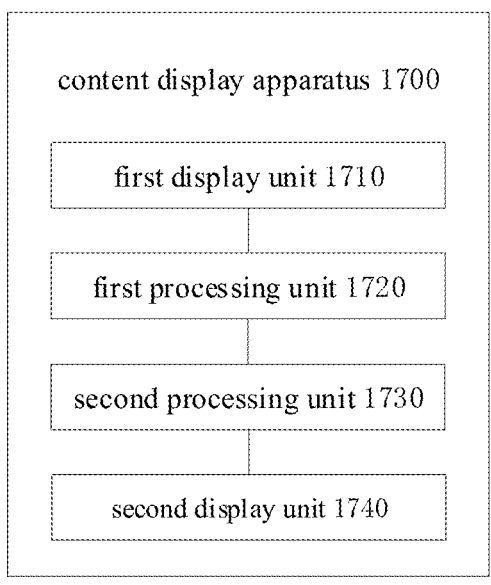
FIG. 17 is a schematic structural diagram illustrating a content display apparatus according to an embodiment of the disclosure.

FIG. 17 is a schematic structural diagram illustrating a content display apparatus provided by an embodiment of the present disclosure.

In the embodiment of the disclosure, the content display apparatus may be an electronic device. The electronic device may include, but is not limited to, a mobile terminal such as a mobile phone, a laptop computer, a digital broadcast receiver, a PDA, a PAD, a PMP, a vehicle terminal (e.g., a car navigation terminal), a wearable device, and the like, or a stationary terminal such as a digital TV, a desktop computer, a smart home device, and the like.

As shown in FIG. 17, the content display apparatus 1700 may include a first display unit 1710, a first processing unit 1720, a second processing unit 1730, and a second display unit 1740.

The first display unit 1710 is configured to display a first control within the target interactive interface.

The first processing unit 1720 is configured to determine a candidate content list in response to a first trigger operation on the first control, where each candidate content in the candidate content list satisfies a preset screening condition.

The second processing unit 1730 is configured to determine a first content list and a second content list based on the candidate content list according to content features of the candidate contents and/or the interactive contents corresponding to the candidate contents, where each first content in the first content list corresponds to a first type, and each second content in the second content list corresponds to a second type.

The second display unit 1740 is configured to display the first content list and/or the second content list.

In the embodiment of the disclosure, after a first trigger operation on a first control displayed in a target interactive interface is received, a candidate content list including candidate contents satisfying a preset screening condition may be screened out. And then a first content list containing first content of a first type and a second content list containing second content of a second type are determined based on the candidate content list and based on content features of candidate contents and/or the interactive contents corresponding to the candidate contents, and the first content list and/or the second content list are displayed. Since the first content list and/or the second content list can be displayed according to the category based on content features of the candidate content and/or the interactive content corresponding to the candidate content, the user can browse different types of content in different content lists when he/she needs to browse the content, thereby enabling the user to quickly screen out content and promoting the user's willingness to create related content.

In some embodiments of the present disclosure, each candidate content satisfying a preset screening condition includes: the number of interactive contents corresponding to each candidate content is larger than or equal to a first threshold value, and/or the number of the interactions corresponding to each candidate content is larger than or equal to a second threshold value.

In some embodiments of the present disclosure, each candidate content satisfying a preset screening condition includes: the number of the interactive contents corresponding to each first content is larger than or equal to a third threshold value, and/or the number of the interactions corresponding to each first content is larger than or equal to a fourth threshold value; and/or each candidate content satisfying the preset screening condition includes: the number of the interactive contents corresponding to each second content is larger than or equal to a fifth threshold value, and/or the number of the interactions corresponding to each second content is larger than or equal to a sixth threshold value.

In some embodiments of the present disclosure, the content features include at least one of a type feature, an interaction feature, a popularity feature, and a release time feature.

In some embodiments of the present disclosure, the content features include type features determined from video-related text of the candidate content.

In some embodiments of the present disclosure, the candidate content is original content, the first content is the original content and/or a fused content corresponding to the original content, and the second content is the original content and/or a fused content corresponding to the original content.

In some embodiments of the present disclosure, the interactive content is a fused content corresponding to the original content.

In some embodiments of the present disclosure, the second display unit 1740 may be further configured to: skip from the target interactive interface to a display content recommendation interface; display a first tag and a second tag in a first display area of the content recommendation interface, wherein the first tag corresponds to a first content list, and the second tag corresponds to a second content list; and display a target content list in the second display area of the content recommendation interface, wherein the target content list is a content list corresponding to the target tag in the first content list and the second content list, and the target tag is a tag in a selected state in the first tag and the second tag.

In some embodiments of the present disclosure, the candidate content, the first content, and the second content are each video contents.

In some embodiments of the present disclosure, the content display apparatus 1700 may further include a content playing unit and a third display unit.

The content playing unit is configured to play target content corresponding to a second trigger operation, in response to the second trigger operation on the displayed content list.

The third display unit is configured to display a second control in the process of playing the target content, the second control for triggering recording of the target video content, wherein target candidate content corresponding to the target content is fused in the target video content.

In some embodiments of the present disclosure, the content display apparatus 1700 may further include a fourth display unit, a third processing unit, and a fifth display unit.

The fourth display unit is configured to display a third control.

The third processing unit is configured to skip from the target interactive interface to the display video presentation interface in response to a third trigger operation on the third control.

The fifth display unit is configured to display a second control and an interactive content list corresponding to the target content in the video presentation interface, wherein each interactive content in the interactive content list is fused with target candidate content.

In some embodiments of the present disclosure, the target video content further includes a target element being associated with a content feature corresponding to the first type or the second type.

In some embodiments of the present disclosure, the content display apparatus 1700 may further include a sixth display unit, an element obtaining unit, a fourth processing unit, and a content generating unit.

The sixth display unit is configured to display a first video recording interface in response to a fourth trigger operation on the second control, wherein the first video recording interface includes a first interface area and a second interface area, the first interface area is used for recording video content, and the second interface area is used for displaying target candidate content.

The element obtaining unit is configured to obtain a target element.

The fourth processing unit is configured to, in the process of recording the video content, shield a target object within the first interface area with the target element.

The content generating unit is configured to generate target video content using the video content and the target candidate content when the recording of the video content ends.

In some embodiments of the present disclosure, the target interactive interface comprises at least one of: a second video recording interface, wherein the first control is a recording option in the second video recording interface; a video playing interface, wherein the first control is a fixed function button or a pull-down menu option in the video playing interface; or a social interactive interface, wherein the first control is a recommended option in the social interactive interface.

It should be noted that the content display apparatus 1700 shown in FIG. 17 may perform each step in the method embodiments shown in FIGS. 1 to 16 to implement each process and effect in the method embodiment shown in FIGS. 1 to 16, which are not repeated here.

Embodiments of the present disclosure also provide a content display device that may include a processor and a memory storing executable instructions. The processor may be configured to read the executable instructions from the memory and execute the executable instructions to implement the content display method in the above embodiments.

Figure 18:
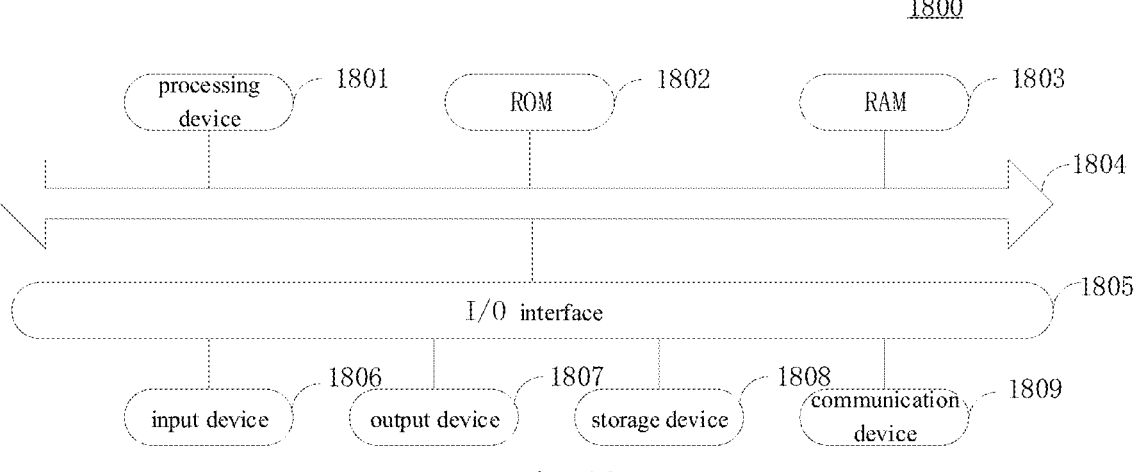
FIG. 18 is a schematic structural diagram of a content display device according to an embodiment of the present disclosure.

FIG. 18 shows a schematic structural diagram of a content display device provided by an embodiment of the present disclosure. Referring now specifically to FIG. 18, a schematic diagram of a content display device 1800 suitable for use in implementing embodiments of the present disclosure is shown.

The content display device 1800 in the embodiment of the present disclosure may be an electronic device. Among them, the electronic device may include, but is not limited to, a mobile terminal such as a mobile phone, a laptop computer, a digital broadcast receiver, a PDA (personal digital assistant), a PAD (tablet computer), a PMP (portable multimedia player), a vehicle terminal (e.g., a car navigation terminal), a wearable device, and the like, or a stationary terminal such as a digital TV, a desktop computer, a smart home device, and the like.

It should be noted that the content display device 1800 shown in FIG. 18 is only an example, and should not bring any limitation to the functions and the scope of the application of the embodiments of the present disclosure.

As shown in FIG. 18, the content display device 1800 may include a processing device (e.g., a central processing unit, a graphics processor, etc.) 1801, which may perform various appropriate actions and processes in accordance with a program stored in a Read Only Memory (ROM) 1802 or a program loaded from a storage device 1808 into a Random Access Memory (RAM) 1803. In the RAM 1803, various programs and data necessary for the operation of the information processing apparatus 1800 are also stored. The processing device 1801, ROM 1802, and RAM 1803 are connected to each other via a bus 1804. An input/output (I/O) interface 1805 is also connected to bus 1804.

Generally, the following devices may be connected to the I/O interface 1805: input devices 1806 including, for example, a touch screen, touch pad, keyboard, mouse, camera, microphone, accelerometer, gyroscope, or the like; output devices 1807 including, for example, a Liquid Crystal Display (LCD), a speaker, a vibrator, or the like; storage devices 1808 including, for example, a magnetic tape, hard disk, or the like; and communication devices 1809. The communication device 1809 may allow the content display device 1800 to communicate with other devices in a wireless or wired manner to exchange data. While FIG. 18 illustrates the content display device 1800 as having various devices, it is to be understood that it is not required that all of the illustrated device be implemented or provided. More or fewer devices may be alternatively implemented or provided.

Embodiments of the present disclosure also provide a computer-readable storage medium storing a computer program, which, when executed by a processor, causes the processor to implement the content display method in the above embodiments. For example, the computer-readable storage medium is a non-transitory computer-readable storage medium.

In particular, according to an embodiment in the disclosure, the processes described above with reference to the flow charts may be implemented as computer software programs. For example, embodiments of the present disclosure include a computer program product comprising a computer program carried on a non-transitory computer-readable medium, the computer program containing program code for performing the method illustrated by the flow chart. In such an embodiment, the computer program may be downloaded and installed from a network via a communication device 1809, or installed from the storage device 1808, or installed from the ROM 1802. The computer program, when executed by the processing device 1801, performs the above-described functions defined in the content display method of the embodiment of the present disclosure.

It should be noted that the computer-readable medium according to the present disclosure may be a computer-readable signal medium or a computer-readable storage medium or any combination of the two. A computer-readable storage medium may be, for example, but not limited to, an electronic, magnetic, optical, electromagnetic, infrared, or semiconductor system, apparatus, or device, or any combination thereof. More specific examples of the computer-readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In the present disclosure, the computer-readable storage medium may be any tangible medium that can contain, or store a program for use by or in connection with an instruction execution system, apparatus, or device. In the present disclosure, the computer-readable signal medium may include a data signal included in the baseband or propagated as a part of the carrier, bearing computer readable program code therein. Such a propagated data signal may take any of a variety of forms, including, but not limited to, electromagnetic signals, optical signals, or any suitable combination thereof. The computer-readable signal medium may be any computer-readable medium other than the computer-readable storage medium. The computer-readable signal medium can communicate, propagate, or transport a program for use by or in connection with an instruction execution system, apparatus, or device. Program code embodied on the computer-readable medium may be transmitted using any appropriate medium, including but not limited to: electrical wires, optical cables, RF (radio frequency), etc., or any suitable combination thereof.

In some embodiments, clients and servers may communicate using any currently known or future developed network protocol, such as HTTP, and may be communicatively (e.g., a communication network) interconnected with any form or medium of digital data. Examples of communication networks include a local area network ("LAN"), a wide area network ("WAN"), an extranet (e.g., the Internet), and a peer-to-peer network (e.g., an ad hoc peer-to-peer network), as well as any currently known or future developed network.

The computer-readable medium may be included in the content display device; or may exist separately without being assembled into the content display device.

The computer-readable medium carries one or more programs that, when executed by the content display device, cause the content display device to: display a first control in a target interactive interface; in response to a first trigger operation on a first control, determine a candidate content list, wherein each candidate content in the candidate content list satisfies a preset screening condition; determine a first content list and a second content list based on the candidate content list according to content features of the candidate contents and/or the interactive contents corresponding to the candidate contents, wherein each first content in the first content list corresponds to a first type, and each second content in the second content list corresponds to a second type; and display the first content list and/or the second content list.

In an embodiment of the present disclosure, computer program code for performing operations of the present disclosure may be written in one or more programming languages, including but not limited to an object oriented programming language such as Java, Smalltalk, C++, as well as conventional procedural programming languages, such as the "C" programming language or similar programming languages, or a combination thereof. The program code may be executed entirely on the user's computer, partly on the user's computer, as a stand-alone software package, partly on the user's computer and partly on a remote computer or entirely on the remote computer or server. Under the condition that a remote computer is involved, the remote computer may be connected to the user's computer via any type of network, including a Local Area Network (LAN) or a Wide Area Network (WAN), or may be connected to an external computer (for example, via the Internet using an Internet service provider).

The flow charts and block diagrams in the figures illustrate the architecture, functionality, and operation of possible implementations of systems, methods and computer program products according to various embodiments of the present disclosure. In this regard, each block in the flow charts or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow charts, and combinations of blocks in the block diagrams and/or flow charts, can be implemented by special purpose hardware-based systems that perform the specified functions or acts, or combinations of special purpose hardware and computer instructions.

The units described in the embodiments of the present disclosure may be implemented by software or hardware. The name of an element does not in some cases constitute a limitation on the element itself.

The functions described hereinabove may be performed, at least in part, by one or more hardware logic components. For example, without limitation, exemplary types of hardware logic components that may be used include: field Programmable Gate Arrays (FPGAs), Application Specific Integrated Circuits (ASICs), Application Specific Standard Products (ASSPs), system on a chip (SOCs), Complex Programmable Logic Devices (CPLDs), and the like.

In the context of this disclosure, a machine-readable medium may be a tangible medium that can contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination thereof. More specific examples of a machine-readable storage medium would include an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof.

In some embodiments of the present disclosure, there is also provided a computer program comprising: instructions which, when executed by a processor, cause the processor to perform a content display method as previously described.

In still further embodiments of the present disclosure, there is also provided a computer program product comprising instructions which, when executed by a processor, implement the content display method as described above.

The foregoing description is only examples of preferred embodiments of the disclosure and is illustrative of the principles of the technology employed. It will be appreciated by those skilled in the art that the scope of the disclosure herein is not limited to the particular combination of features described above, but also encompasses other combinations of features described above or equivalents thereof without departing from the spirit of the disclosure, such as a technical solution formed by interchanging the above features and the technical features disclosed in the present disclosure (but not limited to) having similar functions.

Further, while the respective operations are depicted in a particular order, this should not be understood as requiring that such operations be performed in this particular order shown or in a sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A content display method, comprising:
displaying a first control in a target interactive interface;
in response to a first trigger operation on the first control, displaying at least one of a first content list or a second content list;
wherein the at least one of the first content list or the second content list are comprised in a candidate content list, and respective candidate contents in the candidate content list are configured to be provided to a current user for obtaining third contents, and the third contents comprise content obtained by at least one of image combination or sound combination between content recorded by the current user and original contents corresponding to the candidate content;
the at least one of the first content list or the second content list are determined by:
determining the first content list and the second content list, based on the candidate content list, according to content features of at least one of the respective candidate contents or interactive contents corresponding to the respective candidate contents, wherein each first content in the first content list corresponds to a first type corresponding to third contents obtained by image combination, and each second content in the second content list corresponds to a second type corresponding to third contents obtained by sound combination.

2. The method of claim 1, wherein each candidate content in the candidate content list comprises at least one of:
a number of interactive contents corresponding to the respective candidate contents is larger than or equal to a first threshold value, or, a number of the interactions corresponding to the respective candidate contents is larger than or equal to a second threshold value.

3. The method of claim 2, wherein at least one of:
the each candidate content in the candidate content list comprises at least one of: the number of interactive contents corresponding to each first content is larger than or equal to a third threshold value, or the number of interactions corresponding to each first content is larger than or equal to a fourth threshold value; or
the each candidate content in the candidate content list comprises at least one of: the number of interactive contents corresponding to each second content is larger than or equal to a fifth threshold value, or the number of interactions corresponding to each second content is larger than or equal to a sixth threshold value.

4. The method of claim 1, wherein the content features comprise at least one of a type feature, an interaction feature, a popularity feature, and a release time feature.

5. The method of claim 1, wherein the content features comprise a type feature determined from a video-related text of the candidate content.

6. The method of claim 1, wherein the candidate contents are original contents, the interactive contents are third contents corresponding to the original contents, the first content is at least one of original contents or third content corresponding to the original contents, and the second content is at least one of original contents or third content corresponding to the original contents.

7. The method of claim 1, wherein said displaying at least one of said first content list or second content list comprises:
skipping from the target interactive interface to a display content recommendation interface;
displaying a first tag and a second tag in a first display area of the display content recommendation interface, wherein the first tag corresponds to the first content list, and the second tag corresponds to the second content list; and
displaying a target content list in a second display area of the display content recommendation interface, wherein the target content list is a content list corresponding to a target tag in the first content list and the second content list, and the target tag is a tag in a selected state in the first tag and the second tag.

8. The method of claim 1, wherein the candidate content, the first content and the second content each are video contents;
the method further comprising:
subsequent to displaying at least one of the first content list or the second content list, in response to a second trigger operation on the displayed content list, playing target content corresponding to the second trigger operation; and
displaying a second control in the process of playing of the target content, wherein the second control is used for triggering recording of target video content, and the target video content is fused with target candidate content corresponding to the target content.

9. The method of claim 8, in the process of playing of the target content, the method further comprises:
displaying a third control;
in response to a third trigger operation on the third control, skipping from the target interactive interface to a display video presentation interface; and
displaying the second control and an interactive content list corresponding to the target content in the display video presentation interface, wherein the respective interactive contents in the interactive content list are all fused with the target candidate content.

10. The method of claim 8, wherein the target video content further comprises a target element that is associated with a content feature corresponding to a first type or a second type.

11. The method of claim 8, further comprising:
in response to a fourth trigger operation on the second control, displaying a first video recording interface, wherein the first video recording interface comprises a first interface area and a second interface area, the first interface area is used for recording video content, and the second interface area is used for displaying the target candidate content;
acquiring a target element;

in the process of recording the video content, shielding a target object in the first interface area by using the target element; and when the video content recording is finished, generating the target video content by using the video content and the target candidate content.

12. The method of claim 1, wherein the target interactive interface comprises at least one of:

a second video recording interface, wherein the first control is a recording option in the second video recording interface;

a video playing interface, wherein the first control is a fixed function button or a dropdown menu option in the video playing interface; or a social interactive interface, wherein the first control is a recommendation option in the social interactive interface.

13. An electronic device, comprising:

a processor; and a memory for storing executable instructions;

wherein the executable instructions, when executed by the processor, cause the processor to:

display a first control in a target interactive interface;

in response to a first trigger operation on the first control, display a first content list or a second content list;

wherein the at least one of the first content list or the second content list are comprised in a candidate content list, and respective candidate contents in the candidate content list are configured to be provided to a current user for obtaining third contents, and the third contents comprise content obtained by at least one of image combination or sound combination between content recorded by the current user and original contents corresponding to the candidate content;

the at least one of the first content list or the second content list are determined by:

determining the first content list and the second content list based on the candidate content list according to content features of at least one of the respective candidate contents or interactive contents corresponding to the respective candidate contents, wherein each first content in the first content list corresponds to a first type corresponding to third contents obtained by image combination, and each second content in the second content list corresponds to a second type corresponding to third contents obtained by sound combination.

14. The electronic device of claim 13, wherein each candidate content satisfying a preset screening condition comprises at least one of:

a number of interactive contents corresponding to the respective candidate contents is larger than or equal to a first threshold value, or, a number of the interactions corresponding to the respective candidate contents is larger than or equal to a second threshold value.

15. The electronic device of claim 14, wherein at least one of:

the each candidate content in the candidate content list comprises at least one of: the number of interactive contents corresponding to each first content is larger than or equal to a third threshold value, or the number of the interactions corresponding to each first content is larger than or equal to a fourth threshold value; or the each candidate content in the candidate content list comprises at least one of: the number of interactive contents corresponding to each second content is larger than or equal to a fifth threshold value, or the number of interactions corresponding to each second content is larger than or equal to a sixth threshold value.

16. The electronic device of claim 13, wherein the content features comprise at least one of a type feature, an interaction feature, a popularity feature, and a release time feature.

17. The electronic device of claim 13, wherein the content features comprise a type feature determined from a video-related text of the candidate content.

18. The electronic device of claim 13, wherein the candidate contents are original contents, the interactive contents are third contents corresponding to the original contents, the first content is at least one of original contents or third content corresponding to the original contents, and the second content is at least one of original contents or third content corresponding to the original contents.

19. The electronic device of claim 13, wherein the instructions for displaying at least one of said first content list or second content list cause the processor to:

skip from the target interactive interface to a display content recommendation interface;

display a first tag and a second tag in a first display area of the display content recommendation interface, wherein the first tag corresponds to the first content list, and the second tag corresponds to the second content list; and display a target content list in a second display area of the display content recommendation interface, wherein the target content list is a content list corresponding to a target tag in the first content list and the second content list, and the target tag is a tag in a selected state in the first tag and the second tag.

20. A non-transitory computer-readable storage medium storing a computer program which, when executed by a processor, causes the processor to:

display a first control in a target interactive interface;

in response to a first trigger operation on the first control, display at least one of a first content list or a second content list;

wherein the at least one of the first content list or the second content list are comprised in a candidate content list, and respective candidate contents in the candidate content list are configured to be provided to a current user for obtaining third contents, and the third contents comprise content obtained by at least one of image combination or sound combination between content recorded by the current user and original contents corresponding to the candidate content;

the at least one of the first content list or the second content list are determined by:

determining the first content list and the second content list based on the candidate content list according to content features of at least one of the respective candidate contents or interactive contents corresponding to the respective candidate contents, wherein each first content in the first content list corresponds to a first type corresponding to third contents obtained by image combination, and each second content in the second content list corresponds to a second type corresponding to third contents obtained by sound combination.

* * * * *